United States Patent [19]

Nagai et al.

[11] Patent Number: 5,617,898

[45] Date of Patent: Apr. 8, 1997

[54] FLUID PRESSURE APPARATUS

[75] Inventors: Shigekazu Nagai; Akio Saitoh; Masahiko Suzuki, all of Ibaraki-ken, Japan

[73] Assignee: SMC Kabushiki Kaisha, Tokyo, Japan

[21] Appl. No.: 196,205

[22] PCT Filed: Sep. 10, 1992

[86] PCT No.: PCT/JP92/01158

§ 371 Date: Mar. 10, 1994

§ 102(e) Date: Mar. 10, 1994

[87] PCT Pub. No.: WO93/05296

PCT Pub. Date: Mar. 18, 1993

[30] Foreign Application Priority Data

Sep. 10, 1991 [JP] Japan .................... 3-230593
Sep. 10, 1991 [JP] Japan .................... 3-230642

[51] Int. Cl.$^6$ .................................................. F16K 11/00
[52] U.S. Cl. ................................. 137/884; 417/188
[58] Field of Search ........................... 137/884, 560, 137/614.03, 614.04, 624.11; 285/137.1; 294/64.1, 64.2, 65; 417/187, 188

[56] References Cited

U.S. PATENT DOCUMENTS

| 3,654,960 | 4/1972 | Kiernan ................... 137/884 |
| 4,217,647 | 8/1980 | Sjöholm et al. ........... 137/624.11 X |
| 4,432,701 | 2/1984 | Ise . | |
| 4,456,038 | 6/1984 | Gwaltney et al. ......... 137/624.11 X |
| 4,861,232 | 8/1989 | Ise et al. ................... 137/884 X |
| 5,107,899 | 4/1992 | Murphy .................... 137/884 |
| 5,201,560 | 4/1993 | Golden ...................... 294/64.2 |

FOREIGN PATENT DOCUMENTS

226976A1  7/1987  European Pat. Off. .
3818378A1 12/1988 Germany .

*Primary Examiner*—John C. Fox
*Attorney, Agent, or Firm*—Oblon, Spivak, McClelland, Maier & Neustadt, P.C.

[57] ABSTRACT

A fluid pressure apparatus of this invention provides advanced control without imposing an excessive burden on a sequencer. When a plurality of fluid pressure apparatuses are connected to one another by manifolds, the individual fluid pressure apparatuses are provided with controller circuits each having a memory inputted with a control step, wherein each of the controller circuits activates each of control valves and a sensor based on an operating instruction issued from the sequencer to thereby execute processes such as confirmation of a controlled state, a trouble decision, etc.

14 Claims, 26 Drawing Sheets

FLUID PRESSURE APPARATUS

BACKGROUND OF THE INVENTION

1. Field of the Art

The present invention relates to a fluid pressure apparatus and, more particularly, to a vacuum apparatus using air to vacuum hold a workpiece, wherein, when individual fluid pressure apparatuses connected to one another in plural form are used, controlling means such as controllers are attached to the corresponding fluid pressure apparatuses. A sequencer provides timing control and the like on the fluid pressure apparatuses, so as to detect malfunctions or the like, thereby performing advanced control. The present invention also relates to a fluid pressure apparatus wherein, when the fluid pressure apparatus is used either as a fluid pressure apparatus made up of blocks or different types of fluid pressure devices, fluid passages defined in either the blocks or the respective fluid pressure devices are connected by joint surfaces to electrical wires or the like. The joint surfaces are used for either the blocks or the respective fluid pressure devices, and the connecting members which are employed in either the blocks or the respective fluid pressure devices are standardized to thereby simplify the connection as a whole, and to simplify the complex assembly comprised of fluid pressure devices of different types, which are connected to one another.

2. Description of the Related Art

A fluid pressure apparatus for supplying and cutting off a fluid pressure to a working device has heretofore been used under various circumstances. For example, a vacuum unit for supplying a vacuum pressure comprises an ejector, a valve for supplying and cutting off the vacuum pressure, etc., all of which are provided inside the vacuum unit. The vacuum unit is coupled to a suction pad, or the like, used as a working device and operated in response to a signal supplied from a sequencer to supply the vacuum pressure to the suction pad, thereby attracting and feeding a workpiece.

In the vacuum unit referred to above, it is desirable to prevent the workpiece from falling from the suction pad due to a failure in operation of the ejector by confirming all the operated states. That is, there is now a demand for a system in which operating conditions of an ejector and valve can be rapidly confirmed to detect a failure in operation, which is caused by clogging or the like, and for automatically carrying out a process for coping with such a trouble.

However, when such a process is carried out by a sequencer, a problem arises in that, when vacuum units are connected to one another by manifolds, the burden imposed on the sequencer is too great to adequately carry out discrete control, such as ON/OFF timing control or the like for each vacuum unit.

The present invention is intended to solve the above problem. It is an object of the present invention to provide a fluid pressure apparatus capable of reducing the burden imposed on a sequencer, and for carrying out discrete control.

SUMMARY OF THE INVENTION

The fluid pressure apparatus of the present invention can provide superior control without imposing an excessive burden on a sequencer. When a plurality of fluid pressure apparatuses are connected to one another by manifolds or the like, controlling means, each having a memory programmed with a control step, are attached to the respective fluid pressure apparatuses. Then, signals detected by detecting means are compared and analyzed to thereby make a decision whether a malfunction or the like exists and to display a result thereof. Further, when electrical wires are attached to the inside of the fluid pressure apparatus, connectors comprised of conductive elastic bodies are mounted to their corresponding connecting portions. It is thus unnecessary to consider the accuracy of the position at each connecting portion. Moreover, each of the manifolds has standardized surfaces for causing fluid passages to communicate with each other, and a plurality of different types of fluid pressure devices can be connected to each manifold. It is therefore possible to reduce the space occupied by the whole fluid pressure apparatus, and thus effectively make use of available space. In a fluid pressure apparatus to which blocks having different functions from each other are coupled together. Fluid connecting portions, electric signal coupling portions, and block engaging means for connecting the blocks to each other are provided on connecting or joint surfaces thereof or at adjacent places near such joint surfaces. It is therefore possible to easily connect desired blocks to each other. There is also provided a cover for covering fluid pressure devices, such as a solenoid-controlled or electromagnetic valve devices, ejectors, etc., and integrating them in appearance. Thus, the design of the devices can be decided without being restricted by functions or the like of the fluid pressure devices.

DESCRIPTION OF THE PREFERRED EMBODIMENTS

A fluid pressure apparatus according to the present invention will hereinafter be described in detail with reference to the accompanying drawings. In the following embodiments, vacuum units are all described as illustrative examples. It should however be kept in mind that this invention is not limited only to vacuum units. The present invention can also be applied to other fluid pressure apparatuses.

Figure 1:
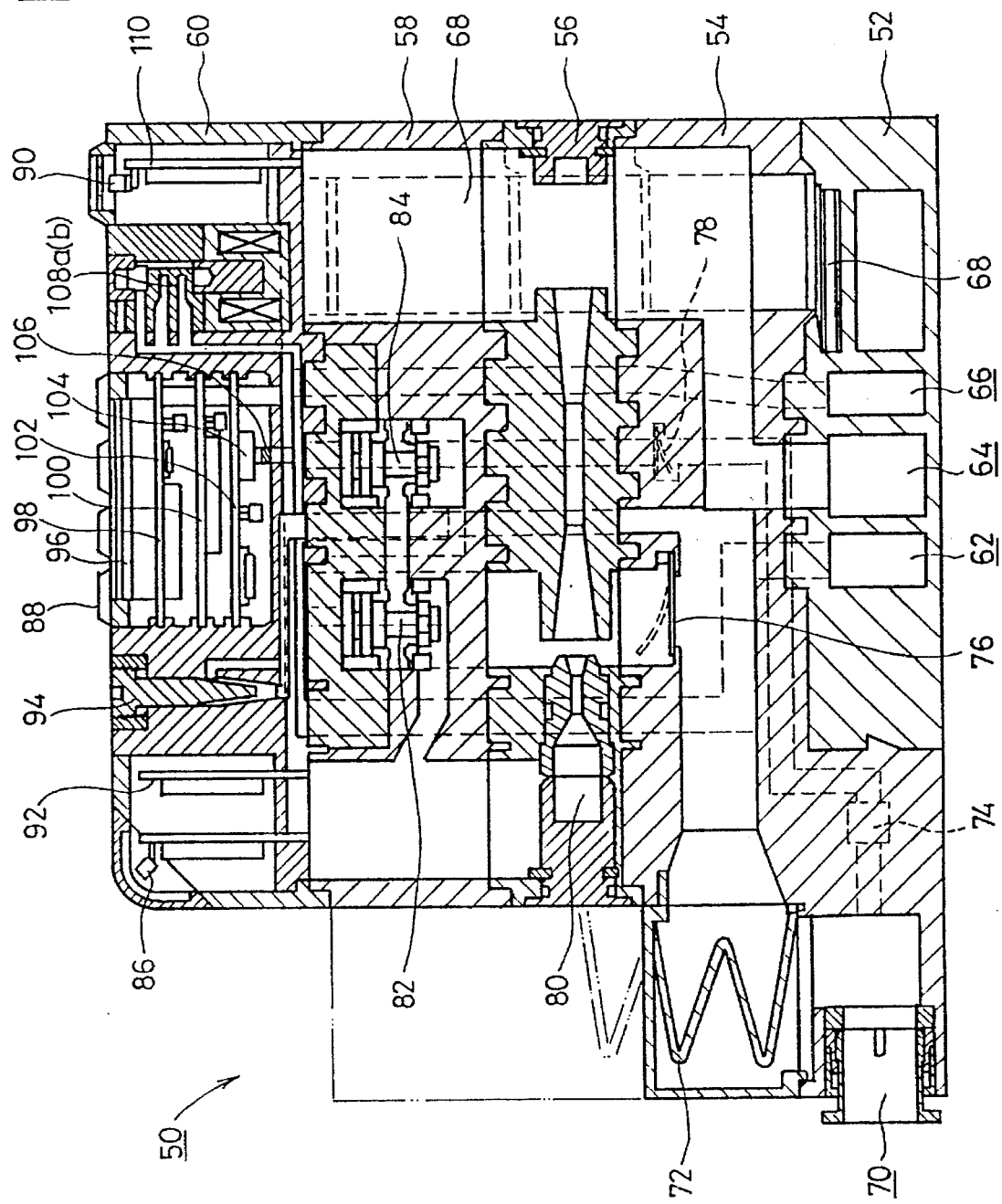
FIG. 1 is a cross-sectional view showing a vacuum unit according to a first embodiment of the present invention.
Figure 2:
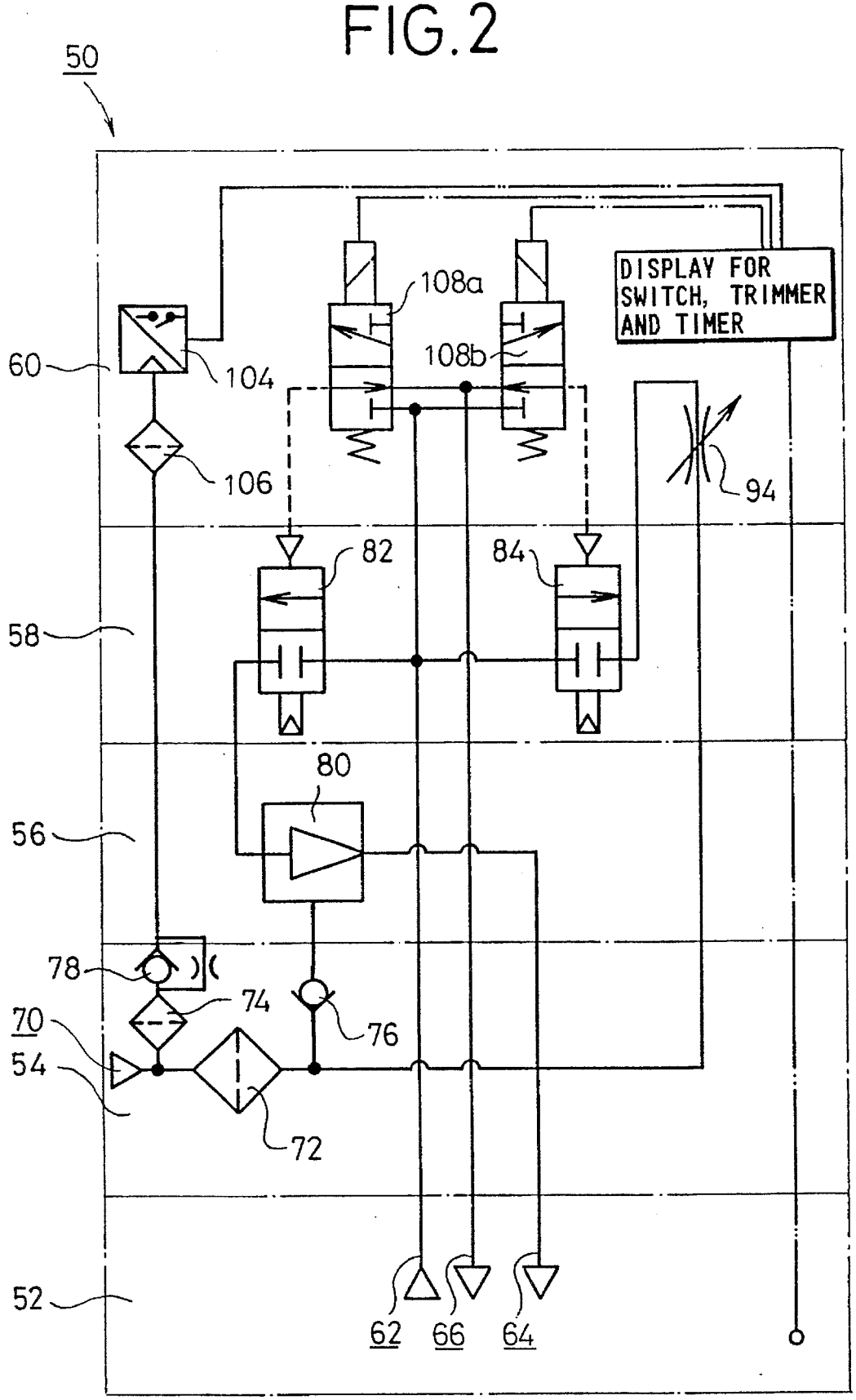
FIG. 2 is a fluid circuit diagram showing the vacuum unit shown in FIG. 1.

As shown in FIGS. 1 and 2, a vacuum unit 50 basically comprises a manifold 52, comprising a filter unit 54, an ejector unit 56, a valve unit 58 and a control unit 60, all of which are provided on the manifold 52.

The manifold 52 has a feed passage 62, a discharge or exhaust passage 64, and an exhaust passage 66 for a pilot valve, all of which are defined therein. Further, the manifold 52 also includes a connector 68 formed by stacking conductive elastic bodies for electrical connection and non-conductive elastic bodies one after the other. The respective passages 62, 64 and 66 and the connector 68 are provided so as to be mutually connected to the manifold 52. Further, they are also connected to fluid devices mounted on an upper portion of each manifold 52.

The filter unit 54 mounted on the manifold 52 has a vacuum port 70 in which a one-touch joint has been incorporated therein so that the vacuum port 70 is connected to a working device such as a suction pad or the like. The vacuum port 70 has passages defined therein, which communicate with a pressure sensor 104, an ejector 80, etc. Further, hydrophobic filters 72 and 74, such as porous fluorine-contained resin membranes, etc., and check valves 76 and 78 are provided so as to extend along their corresponding passages. The filter 72 is so constructed that the elements thereof are shaped in the form of a cartridge, and the cartridge catches dust. As indicated by a two-dot chain line, the filter 72 is also constructed in such a manner that a filter cover thereof can be taken off, and a region or position for the filter 72 can be changed as needed. The check valve 78 closes when a vacuum breakage has occurred in the suction pad. At this time, the check valve 78 prevents a state of vacuum pressure from being gradually released due to the entry of a fluid through a small hole defined in the check valve 78, for example, and prevents the pressure sensor 104 from continuously outputting a signal indicative of an attracted state.

The ejector unit 56 mounted to an upper portion of the filter unit 54 is provided with an ejector 80.

The valve unit 58 mounted to an upper portion of the ejector unit 56 has a feed valve 82 and a vacuum break valve 84.

The control unit 60 mounted to an upper portion of the valve unit 58 has a pressure-switch operation indicating lamp 86, condition setting switches 88 such as sensors, etc., and a pilot valve operation indicating lamp 90. Inside of the control unit, an auxiliary control substrate 92 for a memory and a timer, a flow control valve 94, a display LCD 96 disposed above the flow control valve 94, an LCD disposed below the display LCD 96, a substrate 98 for the switches, a main control substrate 100, a pressure sensor substrate 102, a pressure sensor 104, a hydrophobic and water-preventing filter 106, solenoid-controlled pilot valves 108a and 108b, and a valve driving/controlling substrate 110 are provided.

Figure 3:
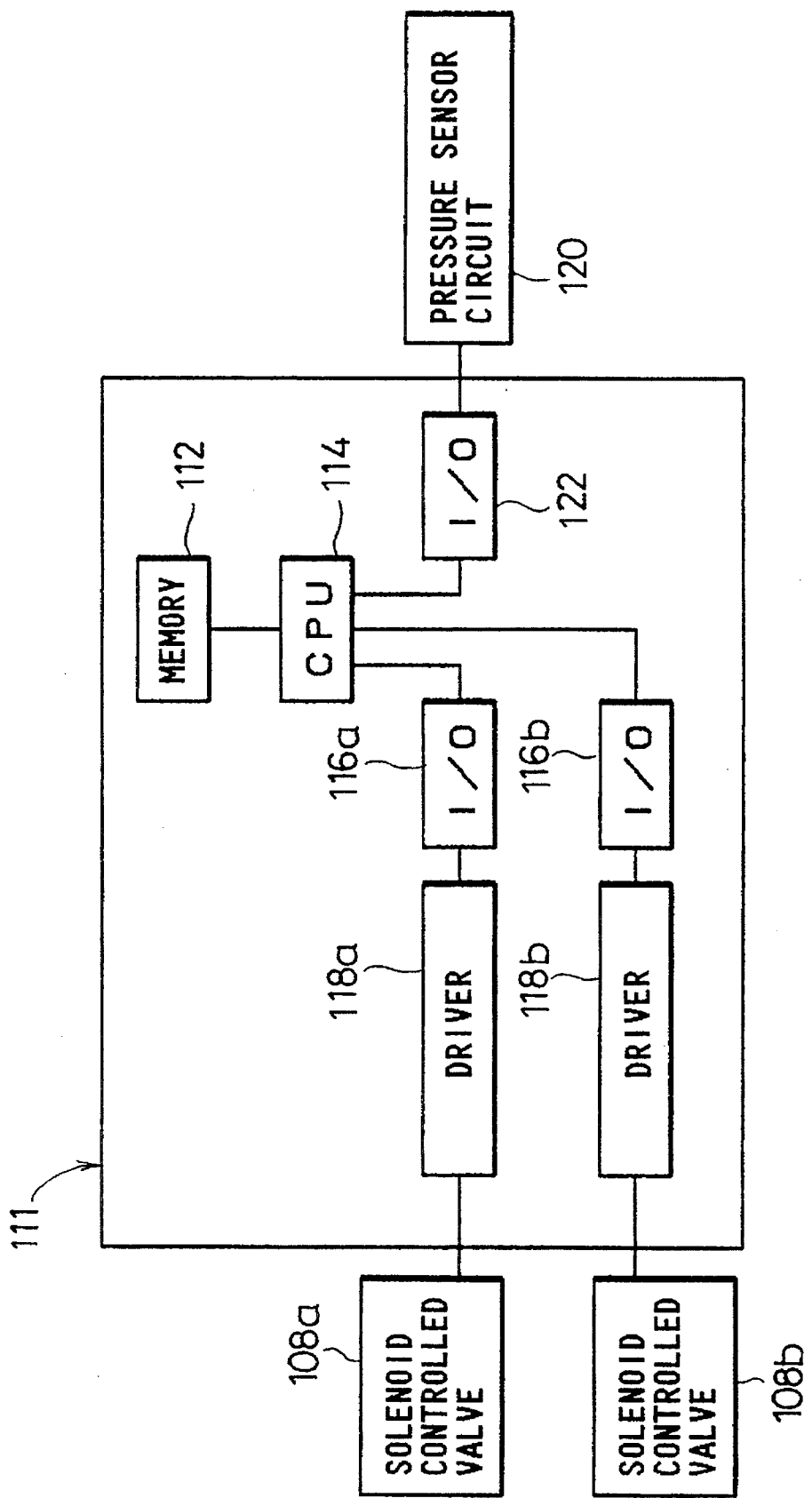
FIG. 3 is a circuit diagram illustrating a controller of the vacuum unit shown in FIG. 1.

A controller circuit 111 of the control unit 60 is constructed as shown in FIG. 3. More specifically, the controller circuit 111 comprises a memory 112 comprised of, for example, a ROM for storing therein working procedures, timer settings, condition settings, etc., and the like via switches 88. The switches 88 correspond to a setting means, a CPU 114, I/O units 116a, 116b and drivers 118a, 118b which are respectively disposed between the CPU 114 and the solenoid-controlled pilot valve 108a connected to the controller circuit 111, and between the CPU 114 and the solenoid-controlled pilot valve 108b connected thereto, and an I/O unit 122 provided between the CPU 114 and a pressure sensor circuit 120 provided inside the pressure sensor 104.

These components may be incorporated into a single substrate or may be divided so as to be disposed on a plurality of substrates. Alternatively, the majority of these components may be shaped in the form of one chip or may be constructed of a small number of dedicated ICs, ASICs, hybrid ICs or the like. Further, a flexible substrate or the like may be used as the substrate which can be bent to improve spatial efficiency.

The electrical connection between each of the substrates and each unit is made by the connector 68 made up of the conductive elastic bodies. However, the electrical connection therebetween may also be performed by means other than the connector 68, such as using a connector or the like provided with male/female pins.

The vacuum unit 50 constructed as described above is operated in the following manner. Specifically, an operator first uses the switches 88 in accordance with working conditions to input setting conditions to the memory 112 of the controller circuit 111. In accordance with the conditions set in the memory 112, an electric signal is then supplied to the solenoid-controlled pilot valve 108a via the CPU 114, the I/O unit 116a and the driver 118a, so as to energize the solenoid-controlled pilot valve 108a and thereby enable the feed passage 62 of the manifold 52 to communicate with a pilot chamber of the feed valve 82 so as to open the feed valve 82. Accordingly, the feed passage 62 communicates with the ejector 80 to open the check valve 76 to thereby suck or draw air from the working device such as a suction pad or the like via the vacuum port 70 and the filter 72. The drawn air and the air used in the ejector 80 are discharged from the exhaust passage 64 of the manifold 52. Because the pressure sensor 104 made of a silicon diaphragm or the like is easily deteriorated by water, the pressure sensor 104 is caused to detect a state of pressure applied to the working device in a state in which water or moisture has been removed by the filters 74 and 106 in order to prevent the pressure sensor 104 from deterioration, and generates a signal for controlling the working device. On the other hand, when a vacuum breakage is to be performed, the controller circuit 111 sends a signal to the solenoid-controlled pilot valve 108a to close the feed valve 82 and transmits a signal to the solenoid-controlled pilot valve 108b to open the vacuum break valve 84. Thus, the vacuum port 70, which is in communication with the working device, communicates with the feed passage 62 to thereby release a vacuum pressure having been applied to the working device. At this time, the check valve 78 is closed to prevent damage to the pressure sensor 104, which can occur due to an abrupt variation in pressure. Further, a small hole defined in the check valve 78 gradually releases the working device from the vacuum pressure, and thereby prevents the pressure sensor 104 from generating an improper operation signal.

The entirety or a part of the vacuum unit 50 is formed with a transparent plastic. The filters, the ejector, the valves, coils, the control unit 60, the passages, a silencer, wires, etc. employed in the vacuum unit 50 can be visually inspected and maintained. Further, a unit to which the vacuum pressure is fed from an external vacuum pump can be constructed as the vacuum unit 50 by removing the ejector unit 56 from the vacuum unit 50, and using the feed valve 82 as a vacuum directional control valve, i.e., as a vacuum selector.

A description of easing the burden imposed on the sequencer due to the above-described operation of the vacuum unit 50 and individually controlling the components will be made with reference to FIGS. 2 through 4. Incidentally, the operation of the vacuum unit 50 is performed for the purpose of attracting and feeding a workpiece by a suction pad or the like.

The sequencer first sends an operating command or instruction to the controller circuit 111 of the vacuum unit 50. The controller circuit 111 causes the CPU 114 to transmit an operation signal to the solenoid-controlled pilot valve 108a via the I/O unit 116a and the driver 118a in accordance with the conditions set in the memory 112. Immediately after the transmission of the operation signal to the solenoid-controlled pilot valve 108a, the CPU 114 also sends an operation signal to the pressure sensor 104 in the same manner as described above. Thus, compressed air is introduced into the ejector 80 provided inside the vacuum unit 50 from the feed valve 82 to thereby produce a vacuum pressure, which is in turn supplied to the suction pad via a tube. During this period, the pressure sensor 104 detects or measures the vacuum pressure in the vacuum port 70, and information about the measured vacuum pressure is displayed on the LCD 96. Thereafter, the pressure sensor 104 supplies the information to the CPU 114 in succession. The CPU 114 compares the information with each of a predetermined vacuum trouble limit and an attraction-confirmative vacuum pressure. The information may be displayed on a display circuit as an alternative to the CPU 114.

Here, the predetermined vacuum trouble limit is a vacuum pressure in which the attraction and feeding of the workpiece by the vacuum unit 50 can be impeded. If the vacuum pressure in the vacuum port 70 does not meet the predetermined vacuum trouble limit, then a trouble condition is displayed in the LCD 96 of the control unit 60, and a signal indicative of the trouble is sent to the sequencer simultaneously with the display thereof.

The attraction-confirmative vacuum pressure is a vacuum pressure used to confirm that the workpiece has been attracted by the suction pad supplied with the vacuum, and that the vacuum pressure in the vacuum port 70 has reached a desired vacuum pressure. If it is decided based on the result of comparison by the CPU 114 that the detected vacuum pressure of the vacuum port 70 exceeds the attraction-confirmative vacuum pressure set in the memory 112 in advance, then the LCD 96 performs an attraction confirmative display.

Thereafter, when the controller circuit 111 receives a work-movement confirmative signal based on a signal supplied from a switch or the like provided on a conveying device such as a cylinder or the like, and after the elapse of a predetermined time interval set by a timer for the feed valve in the memory 112, the CPU 114 sends a signal to the feed valve 82 for stopping the operation thereof in accordance with a program set in the memory 112.

The feed valve 82 stops operating in response to the signal supplied from the CPU 114, so that the generation of the vacuum pressure in the ejector 80 is stopped. Simultaneously, the CPU 114 sends a command break to the vacuum break valve 84 to supply compressed air to the suction pad via the vacuum port 70. As a result, the time required to feed air is controlled by a timer or the like, and vacuum breakage is performed based on a signal supplied from a switch or other external device.

During this period, the pressure sensor 104 measures the pressure in the vacuum port 70. Further, information about the measured pressure is displayed on the LCD 96 and sent to the controller circuit 111 in succession. The CPU 114 of the controller circuit 111 compares the information with a breakage confirmative air pressure which has been preset in the memory 112.

Here, the breakage confirmative air pressure is an air pressure which is used to confirm that the work has been completely separated from the suction pad, and that an air pressure in the vacuum port 70 has reached the atmospheric pressure. When the air pressure falls below the breakage confirmative air pressure which has been preset in the memory 112, the LCD 96 makes a breakage confirmation display, and at the same time the CPU 114 sends an operation stop signal to the vacuum break valve 84 and the pressure sensor 104. As a result, the vacuum break valve 84 and the pressure sensor 104 stop operating. Thereafter, the controller circuit 111 sends a series of operation completion signals to the sequencer to thereby finish all of the attracting and feeding operations by the vacuum unit 50.

Figure 4:
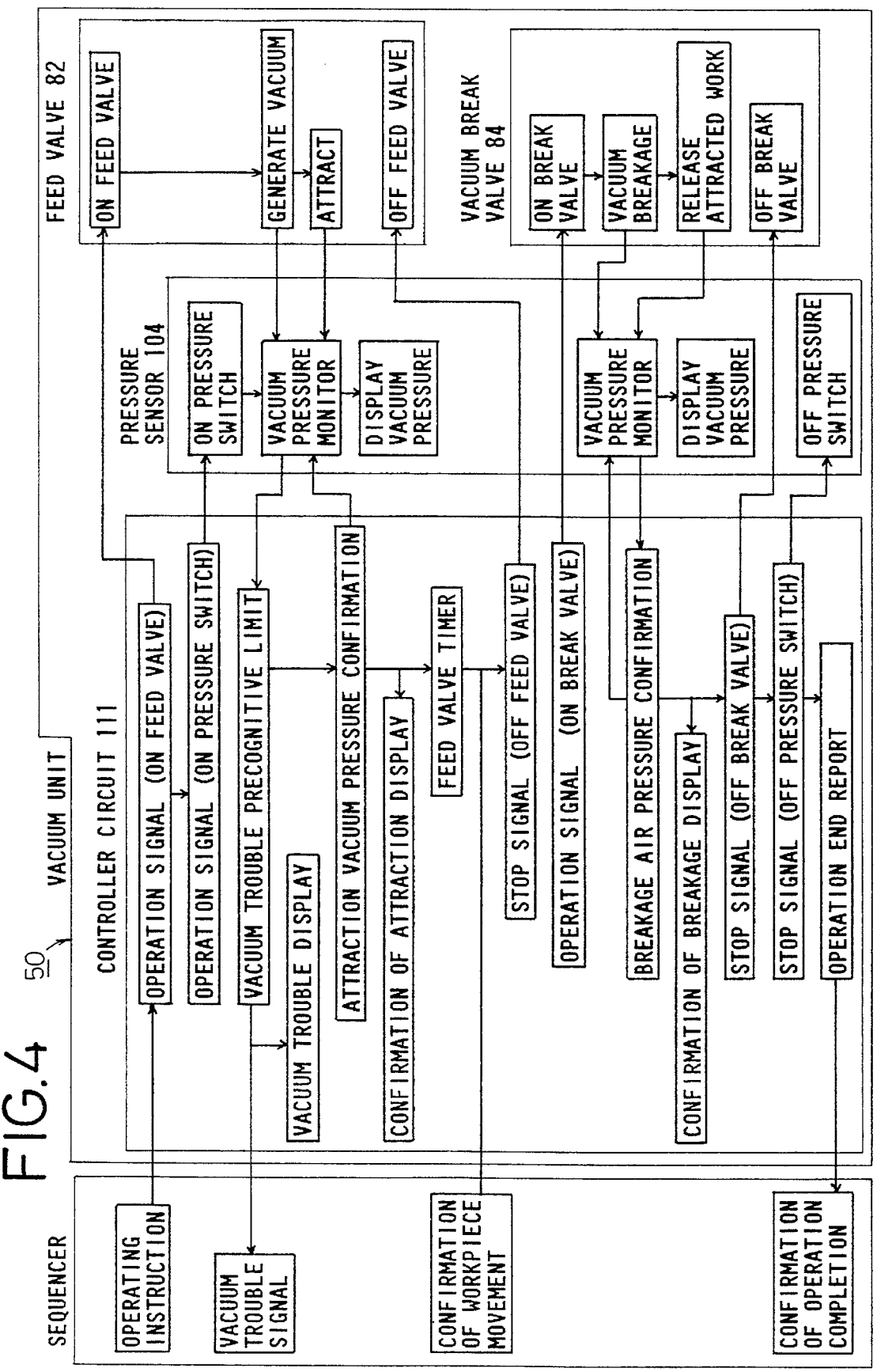
FIG. 4 is a view for describing the control of the vacuum unit shown in FIG. 1.

In the present embodiment, as shown in FIG. 4, a portion of the control of the sequencer is taken care of by the controller circuit 111 so that the burden imposed on the sequencer is reduced. Control of an increased number of vacuum units connected to one another by a manifold is made possible by the reduction in the burden imposed on the sequencer. Alternatively, assuming the control capacity of the control unit 60 is sufficient, it is then possible to perform fine control of each vacuum unit, which has been unattainable in the prior art.

Figure 5:
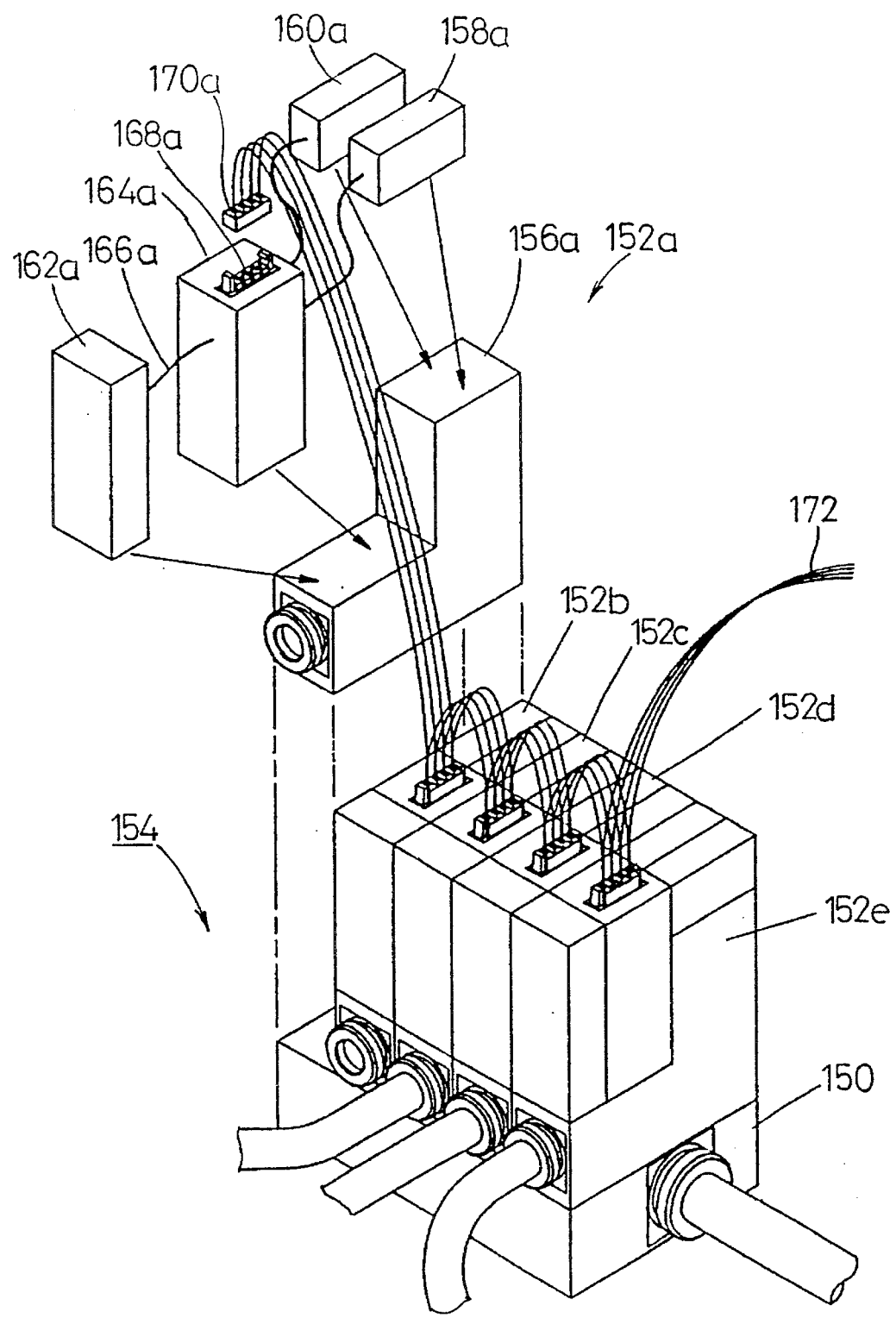
FIG. 5 is a view for describing the electrical connections between a vacuum generating unit with a local controller and a sequencer, according to a second embodiment of the present invention.

A system for controlling a plurality of control units of this type will be described below as a second embodiment with reference to FIG. 5. FIG. 5 shows a vacuum apparatus 154 comprising a plurality of vacuum generating units 152a through 152e with local controllers, which are connected to one another by a manifold 150. Vacuum generating unit 152a with a local controller, which has been placed on the manifold 150, is made up of a block 156a having an ejector, a compressed-air feed valve 158a, a vacuum break valve 160a, an attraction confirming switch 162a and a controller 164a. The peripheral devices of the vacuum generating unit 152a with the local controller, i.e., the compressed-air feed valve 158a, the vacuum break valve 160a and the attraction confirming switch 162a which is used with either a pressure sensor or a pneumatic bridge, respectively have signal lines or conductors 166a and are individually connected to the controller 164a. The controller 164a has a signal terminal 168a attached to an upper portion thereof and is connected to signal lines 172 via a connector 170a. The other vacuum generating units 152b through 152e with the local controllers are constructed in the same manner as described above. The signal terminals 168a through 168e of the respective controllers 164a through 164e are connected to one another through the connector 170a and connectors 170b through 170e, and through the signal lines 172. Further, the signal terminal 168e provided at an end of the manifold 150 is connected to an unillustrated sequencer. The signal lines 172 are divided into address signal lines which are used to identify the signals supplied from the sequencer and the individual controllers 164a through 164e, and into data signal lines which are used to transmit information. Each of the respective controller-unit pairs has an address setting means. Thus, the lines which are used for the signals produced from the controllers 164a through 164e can be in the form of a bus line by determining or establishing the communication between the sequencer and the individual controllers 164a through 164e. Further, the lines used for the signals referred to above may also be in the form of a single line by setting complete serial communications between the sequencer and each of the controllers 164a through 164e. Further, the transmission of wireless, light, radio waves or similar space transmission may be performed between such a communicating means and the bus line, as well as the signal conductor, from both inside and outside of the apparatus.

In the present embodiment, each of the controllers 164a through 164e is disposed between the sequencer and each of the peripheral devices of the vacuum generating units 152a through 152e. Thus, in spite of multiple operations performed by the manifold 150, the burden on the sequencer is reduced and the signal lines are greatly reduced due to the shaping of the signal lines 172 in the form of the bus line.

Figure 6:
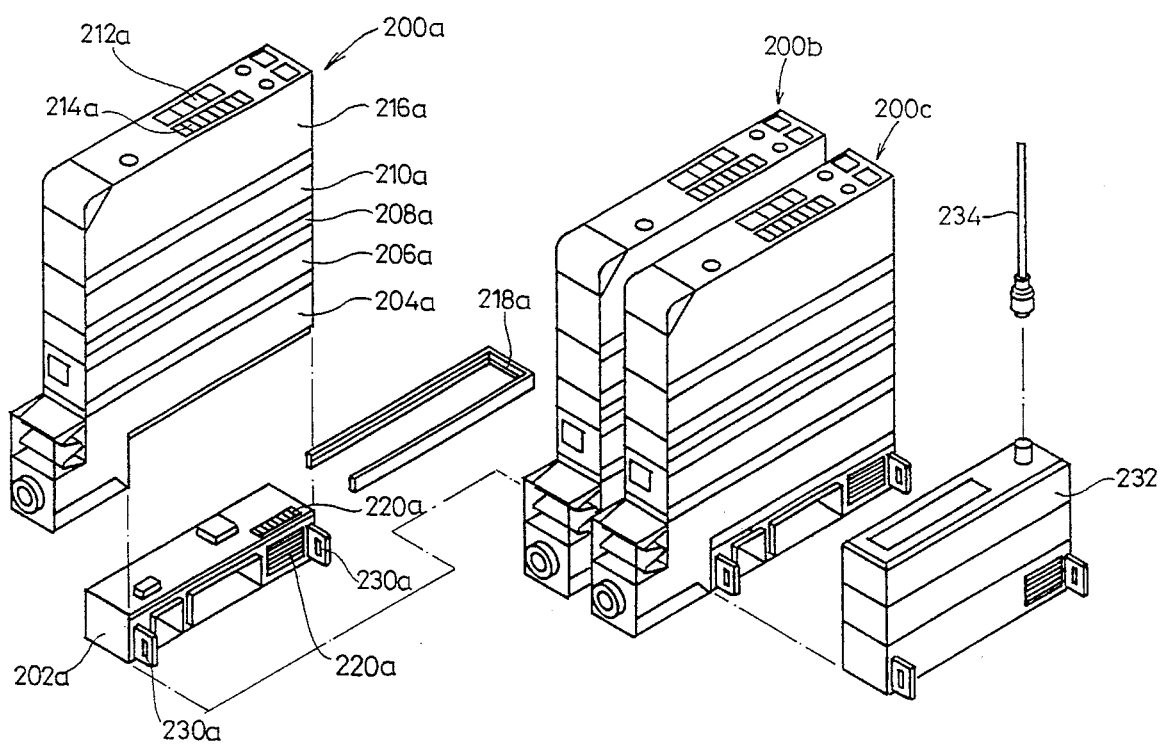
FIG. 6 is a view for describing the electrical connections between a vacuum generating unit with a local controller and a sequencer, according to a third embodiment of the present invention.

Further, a third embodiment will be described below with reference to FIG. 6. FIG. 6 shows vacuum generating units 200a through 200c with local controllers, each of which is made up of blocks having separate functions. The vacuum generating unit 200a is formed by stacking on top of a manifold block a filter block 204a, an ejector block 206a, a pressure sensor block 208a, a valve block 210a having a compressed-air feed valve and a vacuum break valve, and a control block 216a having a conditions setting portion 212a and a display 214a, wherein the stacked portion is connected to the manifold block 202a by a connecting member 218a. Each of the blocks 202a, 204a, 206a, 208a, 210a and 216a has an electrical connecting portion 220a comprised of a rubber contactor.

Figure 7:
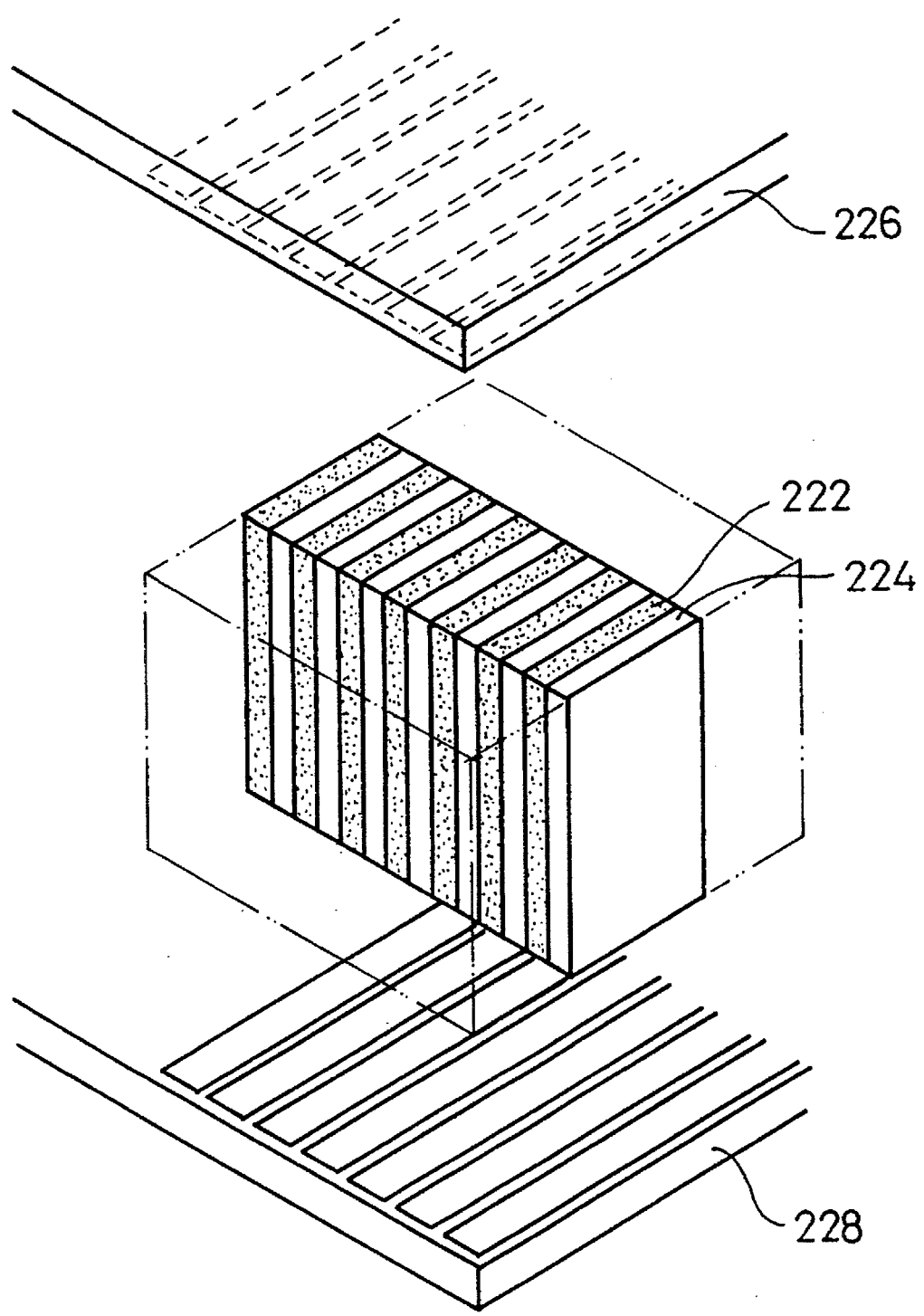
FIG. 7 is a view for describing the electrical connection made to rubber contactors employed in the third embodiment shown in FIG. 6.

As shown in FIG. 7, the rubber contactor is formed by stacking conductive elastic bodies 222 and non-conductive elastic bodies 224 one after the other. The electrical connection between the rubber contactor constructed in the above-described manner and adjacent substrates 226 and 228 for the adjacent blocks are established by interposing the rubber contactor between the substrates 226 and 228.

Each of the remaining vacuum generating units 200b and 200c is constructed in the same manner as described above. The vacuum generating units 200a through 200c are connected to the blocks adjacent thereto by pairs of locking plates 230a through 230c of the manifold blocks 202a through 202c respectively. When the vacuum generating units are juxtaposed and connected to one another in this way, the manifold block 202a is connected to an unillustrated compressed-air feed source at a side surface thereof which is not in use for connecting any other manifold block.

On the other hand, a wiring block 232 is connected to the vacuum generating unit 200c and coupled to an unillustrated sequencer through a signal line 234.

The wiring block 232 provides parallel communications with each local controller on a pneumatic device or apparatus via an electrical connecting portion 220a using a serial/parallel converter. Further, the wiring block 232 provides communications with a sequencer and an external control device using several signal lines 234. The wiring block 232 also has a display for displaying a state of operation thereon and a signal terminal both of which are mounted thereon. In the present embodiment, the wiring block 232 serves as an intermediate controller for controlling communication with each of the control blocks 216a through 216c. However, the wiring block 232 may also carry out setting, programming, information display and integrated control of each controller.

Each of the controllers referred to above, which can reduce a burden imposed on the sequencer, may have various types and functions, not limited to those described in the present embodiment. First of all, as means for realizing the functions of the controller, there may be: a hardware such as an electrical circuit or the like; a programmable software combined with a CPU, memory, etc.; and a combination of both for setting by programs various deciding items to be set, etc. Further, as controlling methods or methods of setting sensors, addresses, programs, etc., there may be: directly setting the above items using dip switches, rotary multi switches, wire matrix switches, etc., and a trimmer or the like on each controller; connecting programming devices such as a teaching box, etc. to each control unit to thereby effect a setting or control process; collectively downloading data such as programs, etc. from a master control apparatus such as a sequencer upon starting, for example; and a direct connection of a storage device such as a ROM, a memory card or the like to thereby effect a desired setting or control process; etc. Next, as methods of displaying information supplied from controllers, there may be: directly displaying information by controllers such as an LCD, an LED, a lamp, a buzzer, etc.; concentratively performing information displays made by a plurality of controllers such as manifolds, etc. using a display unit; and a concentrative and collective display using a master control apparatus such as a sequencer or the like; etc. Further, as functions for controlling the fluid pressure apparatus, there may be: various displays for diagnosing failures in the fluid pressure apparatus illustrated in the present embodiment, and for determining faulty parts at the time of the failure of the fluid pressure apparatus, and the classification of faults and a display for replacing parts to be replaced such as a silencer, a filter, etc. Moreover, there also may be functions such as a self-diagnosis of faults by the controller itself, such as program errors or sequencer errors or the like and self-resetting of the controller; a self-recovering function effected based on reprograms, etc.; a safety stoppage for preventing a workpiece from falling during various fault conditions, such as failure in fluid pressure, stoppage of a power supply, prevention of a fluid from outflow, and the like; recovery of functions for a fluidics system by safety stoppage for preventing of a workpiece from falling during various condition such as failure in fluid pressure, stoppage of a power supply, prevention of a fluid from outflow, and the like, and by providing auxiliary devices such as a power supply, a sensor, a circuit, etc., and selecting any one of them; an address setup made upon execution of either serial or parallel communications with a master control apparatus such as a sequencer or the like; an attachment of a priority to each communication with the master control apparatus; a timer function for setting a time interval required to operate or actuate an operation valve, a break valve or the like; a function for sensing the state and kind of workpiece using a sensor, and controlling the pressure and flow rate of a fluid to thereby correspond to the capability of the fluid pressure apparatus; etc.

Even in the case of a combination of a control apparatus such as a sequencer or the like, a controller, and a fluid pressure apparatus, there is considered, for example, a method of hierarchizing control structures based on intermediate (management) control units for controlling a plurality of fluidics systems by a single controller and managing communications between a plurality of controllers by setting the controllers, programming the controllers, or providing information displays for the controllers.

A fourth embodiment in which standardized connecting mechanisms for air passages and electrical wires are attached to manifolds will be described below with reference to FIG. 8, wherein the manifolds correspond to pneumatic apparatuses of different types to thereby enable a complex assembly comprised of different pneumatic apparatuses.

Figure 8:
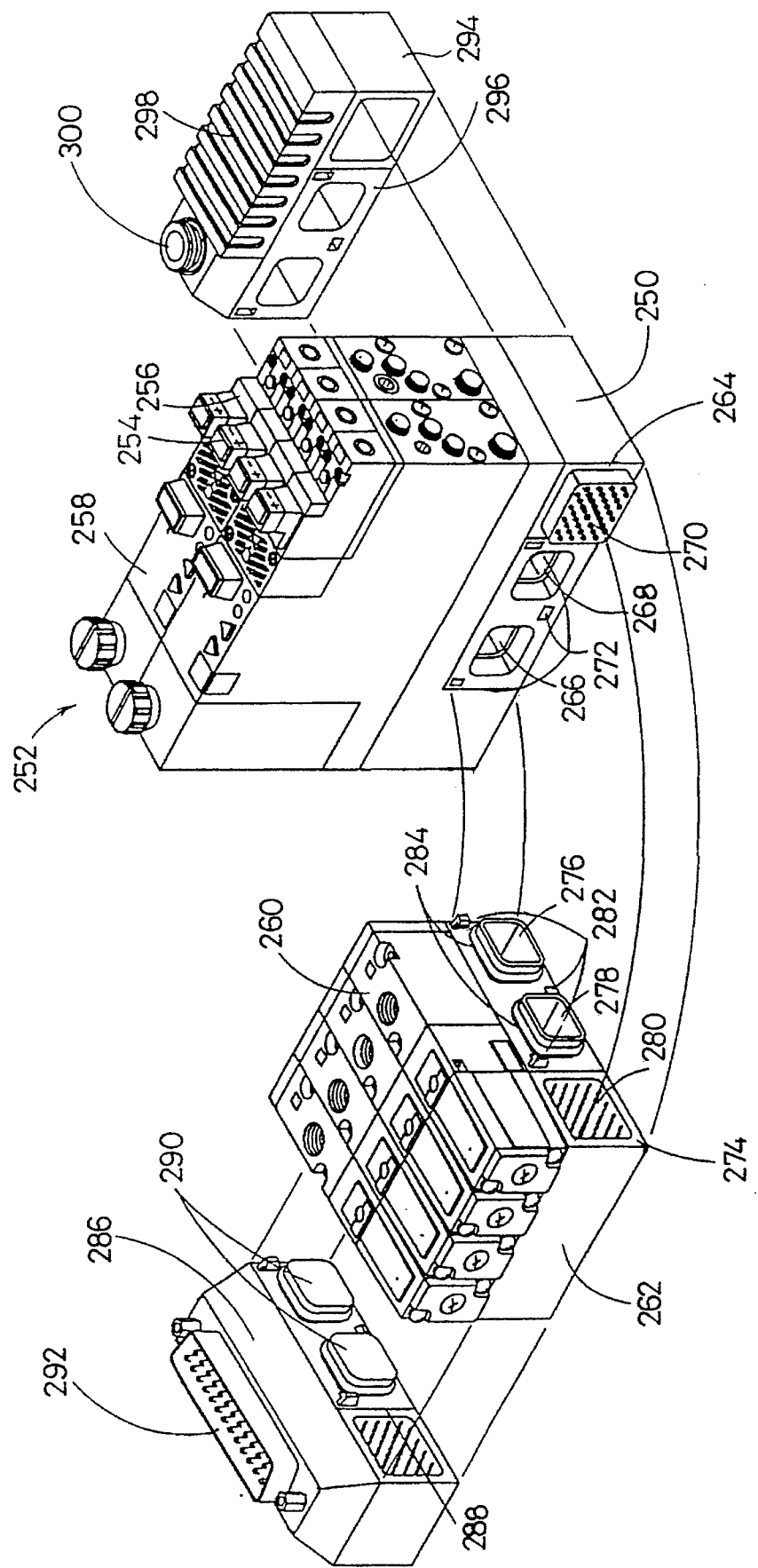
FIG. 8 is a perspective view illustrating the combination of complex assemblies each comprised of pneumatic apparatuses of different types, according to a fourth embodiment of the present invention.

In FIG. 8, reference numeral 250 indicates a manifold used for a vacuum generating unit. The vacuum generating unit 252 mounted on the manifold 250 a pilot-operated solenoid-controlled or electromagnetic valves 254 and 256 for feeding and breakage, and pressure switches 258. A manifold 262 for use with electromagnetic valves 260 is coupled to, one side surface of the manifold 250.

Each of the manifolds 250 and 262 has standardized connecting mechanisms for air passages and electrical wires constructed by a pair of binding surfaces. A joint surface 264 is provided on one side surface of the manifold 250 for the vacuum generating unit. The joint surface 264 comprises: a compressed-air passage connecting portion 266, a discharge air passage connecting portion 268, a connector 270 for providing electrical connections between electrical wires, and stopper insertion holes 272 for connecting and holding stoppers. On the other hand, a joint surface 274 is also provided on one side surface of the manifold 262 of the electromagnetic valves 260. The joint surface 274 comprises: a compressed-air passage connecting portion 276, a discharge air passage connecting portion 278, a connector 280 for providing electrical connections between electrical wires, and connecting and holding stoppers 282. O rings 284 are provided around the two air passage connecting portions 276 and 278, respectively.

When the two manifolds 250 and 262 are coupled to each other, the connection between the manifolds 250 and 262 is performed using the pair of joint surfaces 264 and 274. First of all, the stoppers 282 provided on the joint surface 274 are inserted into the corresponding stopper insertion holes 272 defined in the joint surface 264 and locked together to thereby mechanically connect the manifolds 250 and 262 to each other. The two air passage connecting portions 276 an 278 are respectively inserted into the two air passage connecting portions 266 and 268. Here, the O rings 284, which are provided respectively around the air passage connecting portions 276 and 278, tightly hold the air passage connecting portions due to radially disposed plastic deformations which are provided on the inner walls of the air passage connecting portions 266 and 268. Further, the connectors 270 and 280 are electrically connected to each other so as to provide electrical connections between the electrical wires.

Although not shown in the drawing, a joint surface similar to the joint surface 274 is also formed on a surface opposed to the one side surface of the manifold 250 for the vacuum generating unit. Further, a joint surface similar to the joint surface 264 is also formed on a surface opposite to the one side surface of the manifold 262 for the electromagnetic valves. As a result, the manifolds can be freely combined together, so long as they have connecting mechanisms comprised of the pair of joint surfaces 264 and 274.

A wiring unit 286 for effecting electrical wiring on different types of pneumatic apparatuses is connected to one end of the complete assembly comprised of the so-constructed pneumatic apparatuses of different types. The wiring unit 286 has a joint surface 288 formed on one side surface thereof. Two air-passage connecting mechanisms 290 are provided on the joint surface 288 which serve as blank caps in order to seal the ends of the air passages defined in the series of manifolds constructed as described above. Further, a connector 292, which is connected to a sequencer or the like, is provided on the wiring unit 286.

A pipe-arrangement or piping unit 294 for effecting piping on each of the manifolds 250 and 262 is coupled to the other end of the assembly comprised of the pneumatic apparatuses of different types. The piping unit 294 has a joint surface 296 on one side surface side thereof, but is not provided with a connector used for the connection of electrical wires. Further, the piping unit 294 has a silencer 298 for exhaust and a compressed-air feed port 300, both mounted thereon.

Various pneumatic apparatuses of different types can be manifolded due to the above construction. Thus, air pipe arrangements can be simplified and the pneumatic apparatuses can be connected together within a compact space. Since conductors or wires are arranged within each manifold, extraneous wires can be eliminated, thereby enabling easier control.

Figure 9:
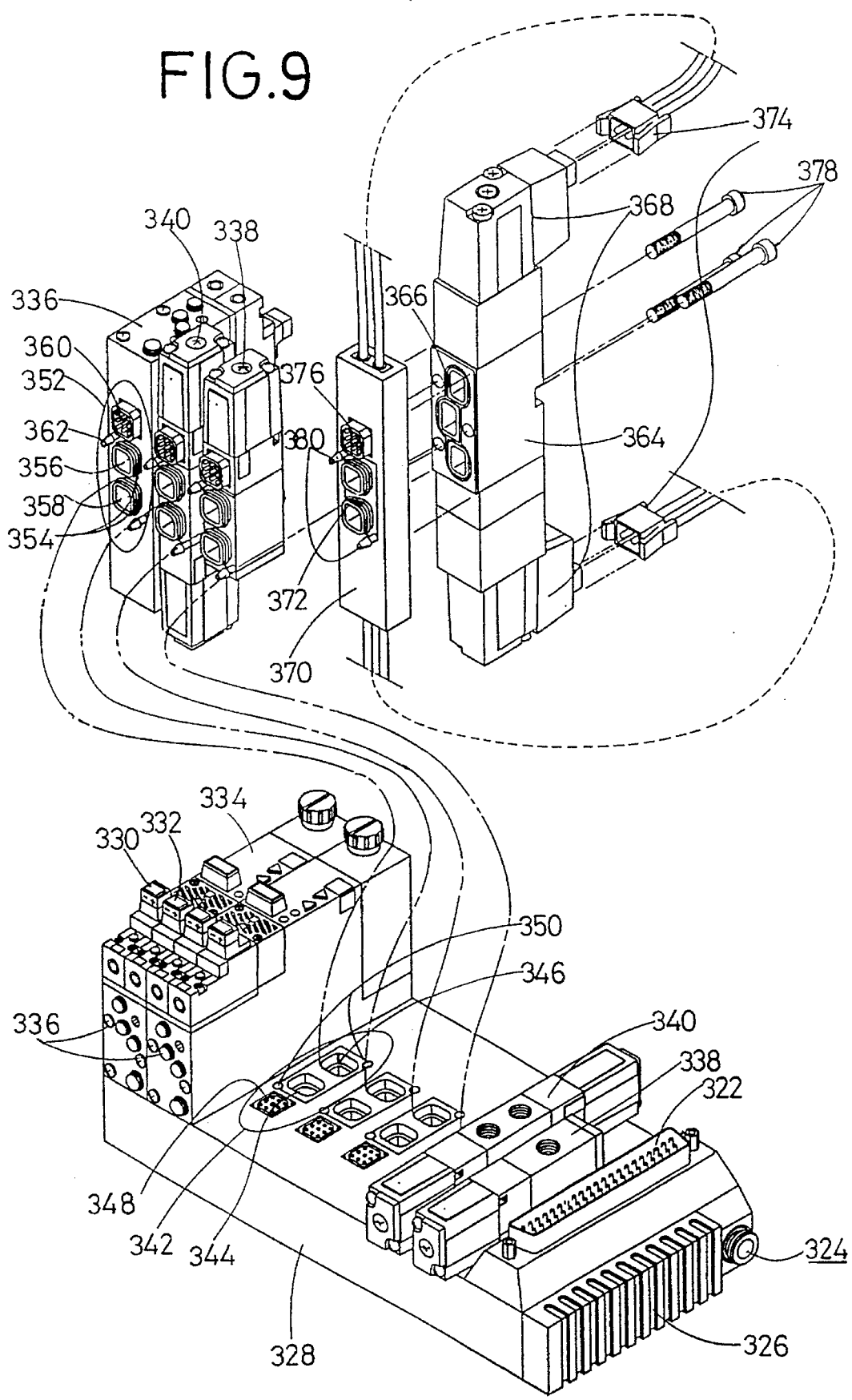
FIG. 9 is a perspective view illustrating the combination of complex assemblies each comprised of pneumatic apparatuses of different types, according to a fifth embodiment of the present invention.

Standardized connecting mechanisms which are attached to a manifold, and to a plurality of types of pneumatic apparatuses, will next be described below as a fifth embodiment with reference to FIG. 9.

In the fifth embodiment, there is provided a manifold 328 having a connector 322 mounted thereon for providing electrical wiring, and a compressed-air feed port 324 and a silencer 326 are both mounted on one side surface thereof. Further, vacuum generating units 336 are mounted on the manifold 328 each vacuum generating unit having an ejector serving as a vacuum source which is provided with a pilot valve 330 for a feed valve, a pilot valve 332 for a break valve and a pressure switch 334, a three port solenoid-controlled or electromagnetic valve 338, and a double-solenoid type four port electromagnetic valve 340.

A set of standardized connecting mechanisms constructed by a pair of joint surfaces is provided within a region formed by the manifold 328, the vacuum generating unit 336 and the electromagnetic valves 338 and 340. Therefore, pneumatic apparatuses having such standardized connecting mechanisms can be freely mounted on the manifold 328.

Each of the joint surfaces 342 for one of the pair of standardized connecting mechanisms is formed on the manifold 328. The joint surface 342 has a compressed-air passage connecting portion 344 for connecting an air passage common to each of the vacuum generating units 336 mounted on the manifold 328 and the electromagnetic valves 338 and 340, a discharge air passage connecting portion 346, and a connector 348 for providing electrical wiring between the pneumatic apparatuses, all of which are formed therein. Further, the joint surface 342 has lock pin insertion holes 350 defined therein for fixing the vacuum generating units 336 and the electromagnetic valves 338 and 340 both mounted on the manifold 328.

Further, a joint surface 352 is formed on a surface which is connected to the manifold 328 used for the vacuum generating units 336, the electromagnetic valves 338 and 340. The joint surface 352 has a compressed-air passage connecting portion 356 having an O ring 354 provided therearound, a discharge air passage connecting portion 358, and a connector 360 for providing electrical wiring between the pneumatic apparatuses, all of which are formed therein. Further, the joint surface 352 has lock pins 362 for fixing the vacuum generating unit 336 and the electromagnetic valves 338 and 340, which are both mounted on the manifold 328.

The pair of joint surfaces 342 and 352 are brought into engagement with each other by inserting the lock pins 362 on the joint surface 352 into the corresponding insertion holes 350 defined in the joint surface 342, and locking the joint surfaces by the lock pins 362. At the same time, the air passage connecting portions 356 and 358 are inserted into the corresponding air passage connecting portions 344 and 346, so that the air passages are tightly coupled to each other due to plastic deformations resulting from radial loads of the O rings 354 provided around the air passage connecting portions 356 and 358, and which are applied to the inner walls of the air passage connecting portions 344 and 346. Further, the connectors 348 and 360 are connected to each other to make electrical connections between electrical wires.

Pneumatic devices which do not have standardized connecting mechanisms may also be mounted on the manifold by providing a suitable adapter between the pneumatic devices and the manifold. For example, a solenoid-controlled or electromagnetic valve 364 as shown in FIG. 9 is provided with a connecting portion 366 for an air passage having a unique layout at the bottom thereof. Further, connectors are directly used so as to make electrical connections of wires to solenoids 368. It is therefore not possible to directly mount such pneumatic devices on the manifold 328 having standardized connecting or joint surfaces. Thus, an adapter 370 is used between the electromagnetic valve 364 and the manifold 328. The adapter 370 has a connecting or joint surface 372 and an air-passage connecting portion held in alignment with the electromagnetic valve 364, which is formed on a surface opposite to the joint surface 372. Thus, air passages defined in both the adapter 370 and the electromagnetic valve 364 communicate with each other on the inner side of the adapter 370. Electrical wires for the solenoids 368 are electrically connected to two connectors 374 extending from the adapter 370. Further, the electrical wires are electrically connected to a connector 376 in the joint surface 372 on the inner side of the adapter 370. The electromagnetic valve 364 is first clamped to the adapter 370 by screws 378, and then coupled to the manifold 328 by lock pins 380 for each adapter 370.

The present embodiment has advantages similar to that obtained in the fourth embodiment. Since any type of pneumatic device can be mounted on one manifold 328, they can be mounted at desired positions without connecting pneumatic devices of one kind to each other. That is, the pneumatic devices can be disposed so as to correspond to the position of each working device to be connected with the pneumatic devices, thereby making it possible to facilitate piping or the like.

Figure 10:
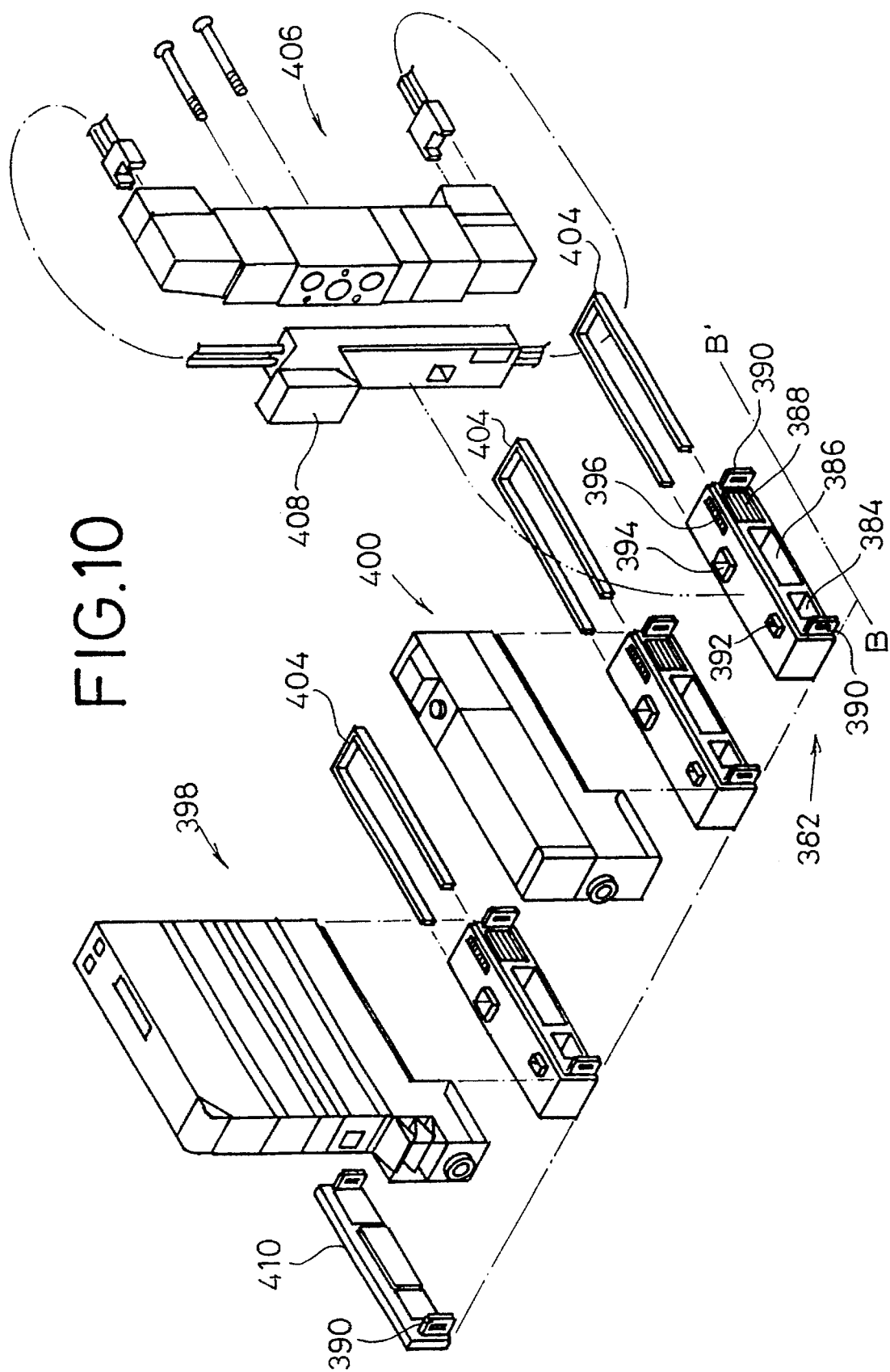
FIG. 10 is a perspective view illustrating the combination of complex assemblies each comprised of pneumatic apparatuses of different types, according to a sixth embodiment of the present invention.
Figure 11:
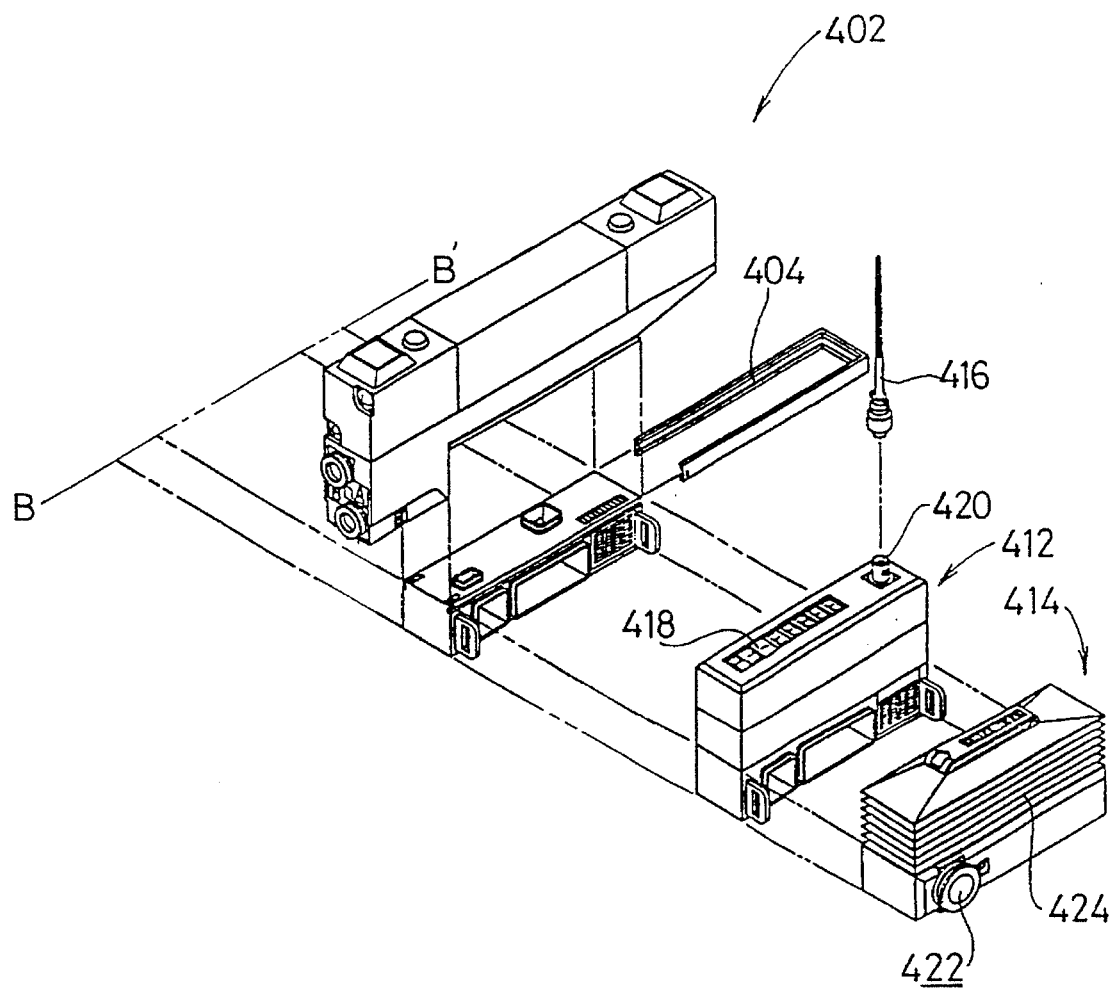
FIG. 11 is another perspective view showing the combination of complex assemblies each comprised of pneumatic apparatuses of different types, which are shown in FIG. 10.

Further, a sixth embodiment will be described in detail with reference to FIGS. 10 and 11. In the sixth embodiment, desired types of pneumatic devices can be mounted on a manifold by means of standardized connecting mechanisms attached to a plurality of types of pneumatic devices mounted on the manifold, in a manner similar to the fifth embodiment.

Each of the manifolds 382 is shaped in the form of a standard rectangle. The manifold 382 has a projected compressed-air passage connecting portion 384, a discharge air passage connecting portion 386, and an electrical wiring connecting portion 388 composed of a rubber contact formed by stacking conductive elastic bodies and non-conductive elastic bodies one after the other, all of which are formed in one side surface thereof. Further, the manifold 382 has a pair of locking plates 390 for connecting adjacent manifolds to each other. Although not shown in the drawing, recessed connecting portions and insertion holes for the locking plates 390, which correspond to the above components formed on the one side surface of the manifold 382, are formed on the side opposite to the one side surface thereof. On the other hand, a projected compressed-air passage connecting portion 392, a discharge air passage connecting portion 394, and an electrical wiring connecting portion 396 comprised of a rubber contactor formed by stacking conductive elastic bodies and non-conductive elastic bodies one after the other, are formed on the upper surface of the manifold 382, all of which are coupled to each of the pneumatic devices mounted on the manifold 382.

Pneumatic devices having standardized connecting or joint surfaces are coupled to the upper portions of the respective manifolds 382. A vacuum generating unit 398 comprised of functionally-separated blocks such as a controller, a valve, a pressure sensor, an ejector, etc., a three port solenoid-controlled or electromagnetic valve 400, and a four port solenoid-controlled or electromagnetic valve 402 are mounted on their corresponding manifolds 382 in a manner similar to the second embodiment as shown in FIGS. 10 and 11. Further, connecting members 404 are inserted into and fixed to their corresponding grooves formed in respective side surfaces of the pneumatic devices and the manifolds 382. A solenoid-controlled or electromagnetic valve 406 which does not have standardized connecting or joint surfaces is mounted on the corresponding manifold 382 using an adapter 408 in a manner similar to the fifth embodiment.

The manifolds 382 constructed as described above are coupled to each other by inserting the locking plates 390 into the adjacent manifolds. An end plate 410 having a pair of locking plates 390 is connected to one end of the manifold to thereby tightly hold the ends of the air passages defined in the manifold.

On the other hand, a wiring module 412 and a piping module 414 are connected to the other end of the manifold. The wiring module 412 communicates with each pneumatic device in parallel using a serial-parallel converter via a discrete conductor or wire. Further, the wiring module 412 communicates with an external control device, such as a sequencer or the like, using several signal lines or conductors 416. A display 418 for displaying the state of operation and a signal terminal 420 are mounted to an upper portion of the wiring module 412. The piping module 414 has a compressed-air feed port 422 and a silencer 424 both provided on the side surface thereof.

In the present embodiment, each of the pneumatic devices can be disposed at a desired position in a manner similar to the fifth embodiment. It is also possible to both increase and decrease the number of the manifolds 382 coupled together, so as to correspond to the number of pneumatic devices which are used simultaneously.

Electrical connections which are made using a rubber contactor will next be described as a seventh embodiment with reference to FIGS. 12 through 14.

Electrical wires 544 and 546 are connected in the following manner. Described specifically, the electrical wires 544 and 546 are connected to substrates 538 and 540 respectively. As shown in FIG. 13, the substrate 540 has a plurality of conductive patterns 548 formed on one of, joint surfaces thereof. Further, extensions 550 are formed so as to be connected to the ends of the conductive patterns 548. The extensions 550 are integrally formed so as to extend up to the other joint surface of the substrate 540 in a manner similar to the extensions 552 formed on the substrate 538. The electrical wires 546 are connected to their corresponding conductive patterns 548 by soldering. A connecting member 556 for providing electrical wiring, which is comprised of conductive elastic bodies, is inserted between the substrates 538 and 540, which are constructed in the above-described manner, to thereby provide the electrical connections.

Figure 14:
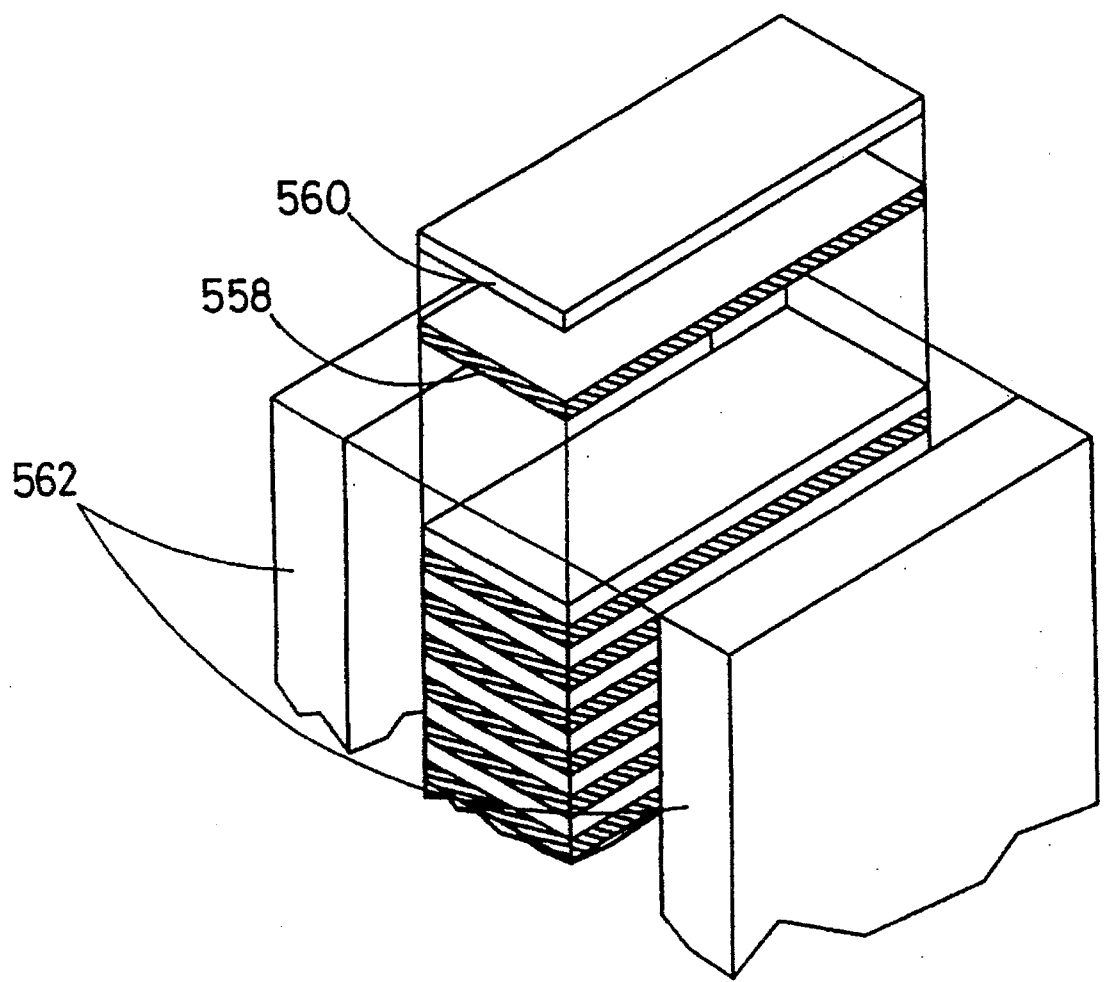
FIG. 14 is a view for describing an electrical wiring connecting member employed in the seventh embodiment of the fluid apparatus according to the present invention.

As shown in FIG. 14, the connecting member 556 is constructed by stacking plate-like conductive elastic bodies 558 and plate-like non-conductive elastic bodies 560 one after the other, and exposing the non-conductive elastic bodies 560 at both ends of the resultant stack, and holding side joint surfaces of the stacked elastic bodies 558 and 560 by non-conductive elastic bodies 562.

Figure 12:
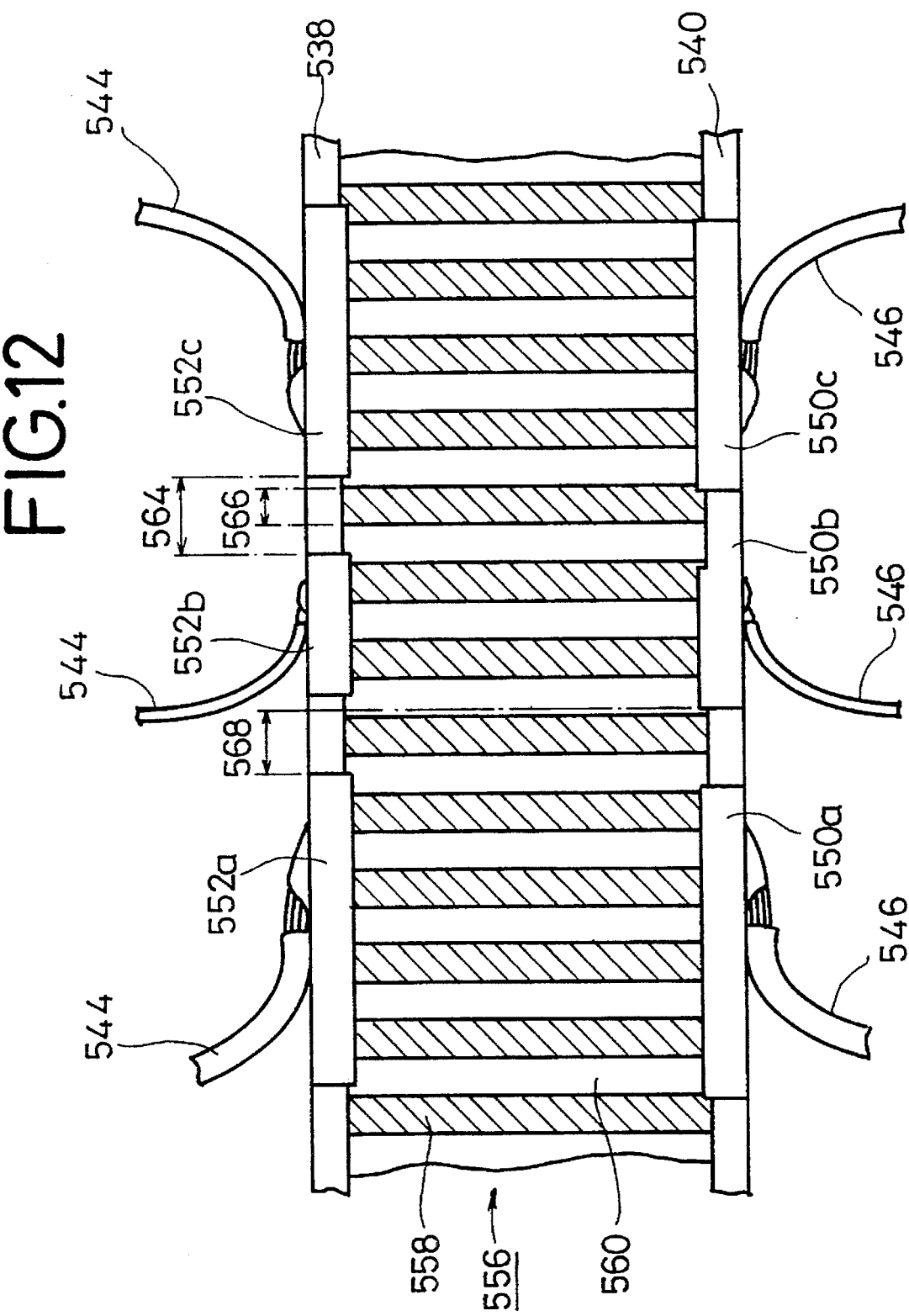
FIG. 12 is a view for describing the electrical connection employed in a seventh embodiment of a fluid apparatus according to the present invention.
Figure 13:
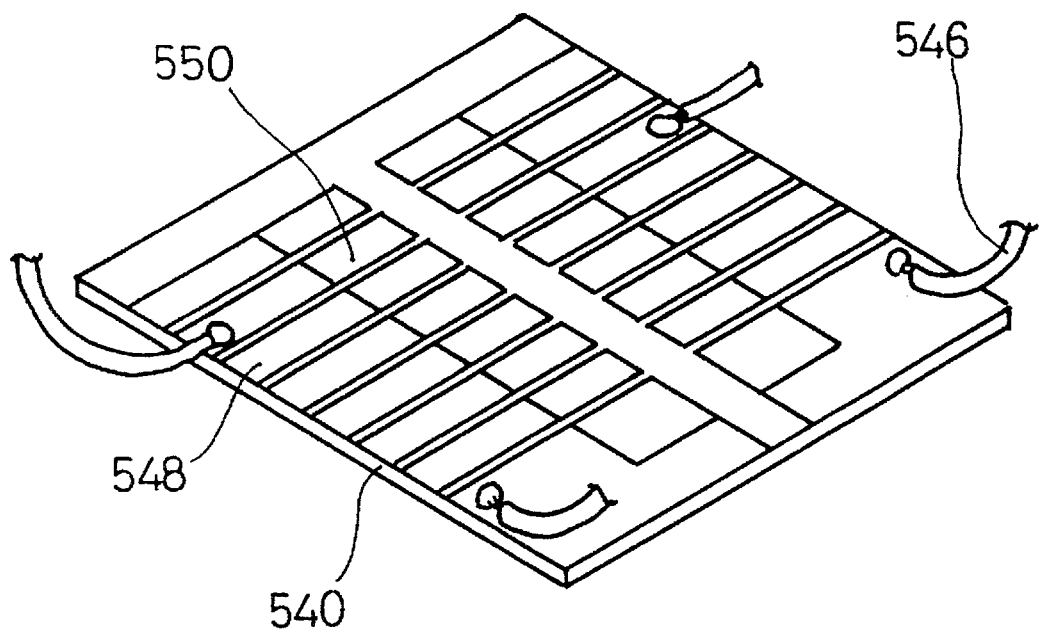
FIG. 13 is a view for explaining a substrate employed in the seventh embodiment of the fluid apparatus according to the present invention.

The electrical connections made in the above-described manner are constructed as shown in FIG. 12. That is, the extensions 552a through 552c of the substrate 538 and extensions 550a through 550c of the substrate 540 are electrically connected to one another by the conductive elastic bodies 558.

The number of the conductive elastic bodies 558 bearing the electrical connections is proportional to the connecting areas of the extensions 552a through 552c and 550a through 550c. Thus, the electrical capacitance necessary for the electrical connections can be adjusted depending on the connecting surfaces of the extensions 552a through 552c and 550a through 550c disposed in facing relationship.

Further, the extension 552b is completely insulated from the extension 552c by providing a space 564 defined between the extension 552b and the extension 552c, which is wider than a width 566 of each conductive elastic body 558. Other extensions are constructed in the same manner as described above. Thus, the space 564 between the adjacent extensions can be reduced by narrowing the width 566 of each conductive elastic body 558. Accordingly, the connecting member 556 can be reduced in size. Alternatively, the electrical connections can be made in multiple form using a constant connecting area.

Since the interval 568 defined between the extension 552a connected to the extension 550a and the extension 550b is wider than the width 566 of each conductive elastic body 558, even if each of the substrates 538 and 540 is positionally displaced, tolerances are given to the accuracy in position. Thus, tolerances are permitted to the positional accuracy in the electrical connections as the width 566 becomes smaller than the interval 568.

Figure 15:
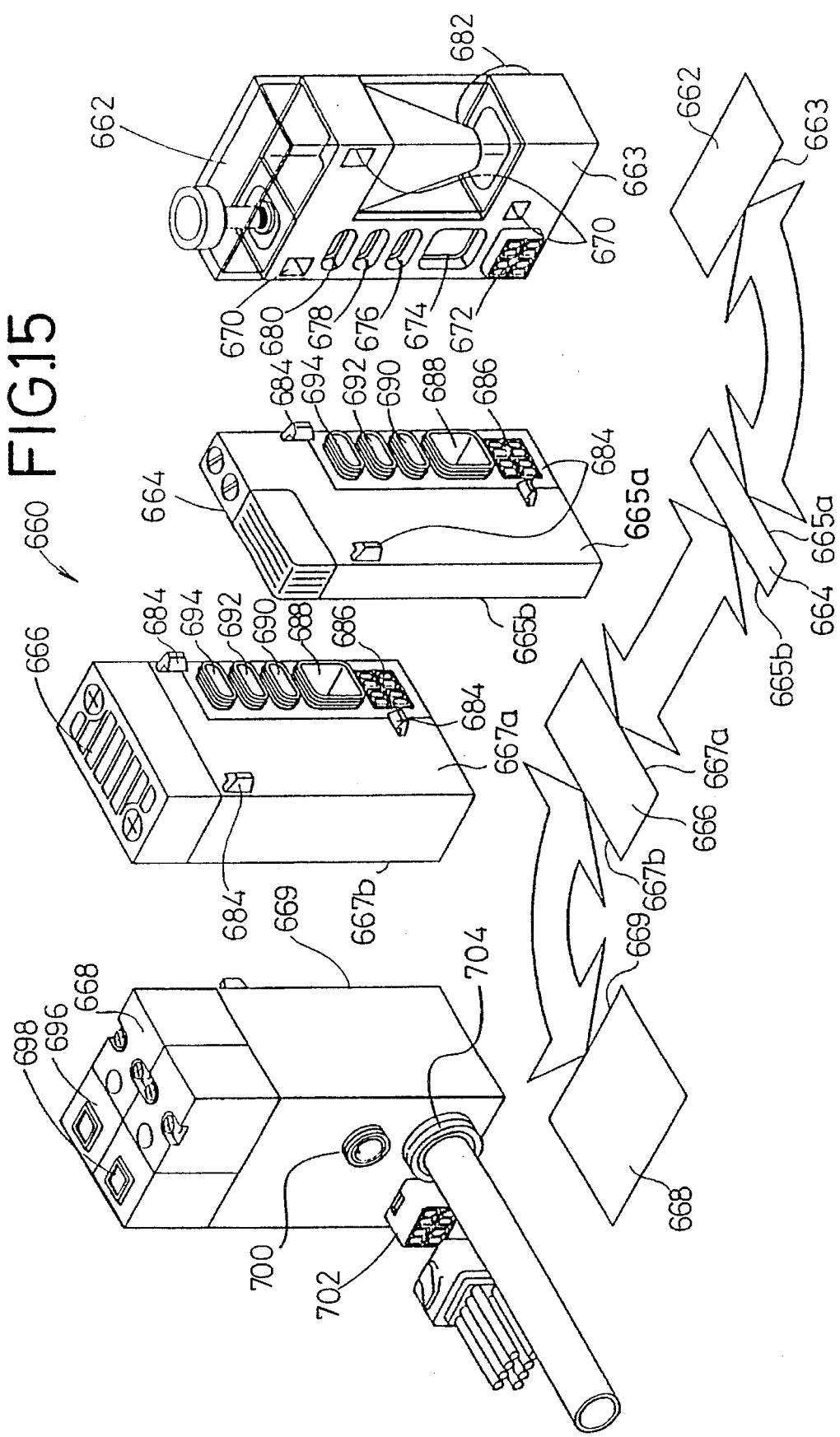
FIG. 15 is a view for describing a vacuum apparatus according to an eighth embodiment of the present invention.

An eighth embodiment will now be described with reference to FIG. 15. Reference numeral 660 indicates a vacuum apparatus comprised of a plurality of respective blocks having joint surfaces, each of which has predetermined functional portions disposed in the same positions. The vacuum apparatus 660 basically comprises a filter block 662, a pressure switch block 664, an ejector block 666 and a valve block 668.

The filter block 662 has a connecting or joint surface 663 to which the other block is coupled. The joint surface 663 includes three stopper insertion holes 670 which serve as block engaging portions, a connector 672 used as an electric signal coupling portion for providing electrical connections between electrical wires, and air passage connecting portions 674, 676, 678 and 680 which serve as fluid passage connecting portions. The air passage connecting portion 674 is used to supply vacuum pressure. The air passage connecting portion 676 is used for compressed air supplied to an ejector. The air passage connecting portion 678 is used for exhaust. The air passage connecting portion 680 is also used for compressed air. A vacuum port 682 extending outside from the vacuum apparatus is formed on a surface of the filter block 662, which is opposite to the joint surface 663.

The pressure switch block 664 has two joint surfaces 665a and 665b held in engagement with other blocks respectively. The joint surface 665a includes three stoppers 684 respectively provided so as to correspond with the stopper insertion holes 670 defined in the joint surface 663 of the filter block 662. A connector 686, for providing electrical connections between electrical wires, is disposed so as to correspond to the connector 672. Air passage connecting portions 688, 690, 692 and 694 respectively are provided so as to correspond to the air passage connecting portions 674, 676, 678 and 680. Further, functional portions similar to those mounted in the joint surface 663 of the filter block 662 are provided on the joint surface 665b at the same positions.

Similarly, a joint surface 667a of the ejector block 666 is constructed similarly to the joint surface 665a of the pressure switch block 664. Further, a joint surface 667b is formed similarly to the joint surface 663 of the filter block 662 and the joint surface 665b of the pressure switch block 664.

The valve block 668 has a pilot-operated electromagnetic valve 696, serving as a feed valve, and a pilot-operated electromagnetic valve 698, serving as a break valve, both of which are attached to an upper portion thereof. Further, the valve block 668 has an exhaust port 700 extending to the outside of the vacuum apparatus 660, an electrical wiring connector 702 and a compressed-air feed port 704, all of which are formed on one side surface of the valve block 668. A connecting or joint surface 669 provided on an opposite side surface of the valve block 668 is constructed similarly to the joint surface 665a of the pressure switch block 664 and the joint surface 667a of the ejector block 666.

A description will next be made of a case where these blocks are connected to one another.

When the filter block 662 and the pressure switch block 664 are coupled to each other, for example, the three stoppers 684 on the joint surface 665a of the pressure switch block 664 are inserted into their corresponding stopper insertion holes 670 on the joint surface 663 of the filter block 662 so that the stoppers 684 are respectively fitted into the stopper insertion holes 670. As a result, the filter block 662 is mechanically coupled to the pressure switch block 664. At the same time, the air passage connecting portions 688, 690, 692 and 694 of the pressure switch block 664 are inserted into their corresponding air passage connecting portions 674, 676, 678 and 680 of the filter block 662.

Figure 16:
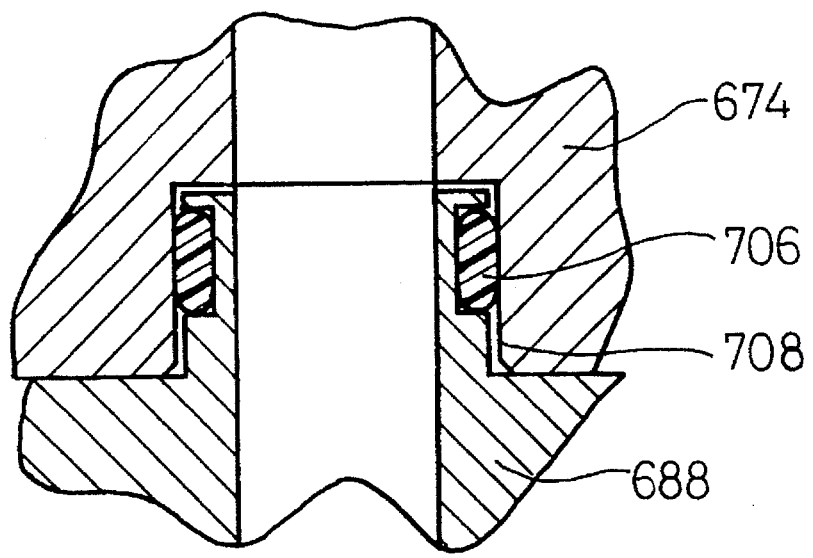
FIG. 16 is a partial explanatory view showing the connection between fluid passages employed in the eighth embodiment shown in FIG. 15.

As shown in FIG. 16, the coupling between the air passage connecting portions 674 and 688 is performed in the following manner. The air passage connecting portion 688 is shaped in a projection and has an O ring 706 provided on its periphery. When the air passage connecting portion 688 is inserted into a recessed air passage connecting portion 674, the O ring 706 is interposed between an inner wall 708 of the air passage connecting portion 674 and the periphery of the air passage connecting portion 688, so as to hold the air passage connecting portions 688 and 674 airtight. Other air passage connecting portions 690 and 676, 692 and 678, and 694 and 680 are respectively coupled to one another in the same manner as described above. Since the O ring 706 is tightly fitted to the inner wall 708 and is brought into sliding contact with the inner wall 708 of the air passage connecting portion 674, which extends parallel to the direction in which the air passage connecting portion 688 is connected to the air passage connecting portion 674, the O ring 682 is not flattened and the connections can be easily and reliably carried out. Further, the projected connector 672 is inserted into the connector 686 to connect electrical wires to each other.

Figure 17:
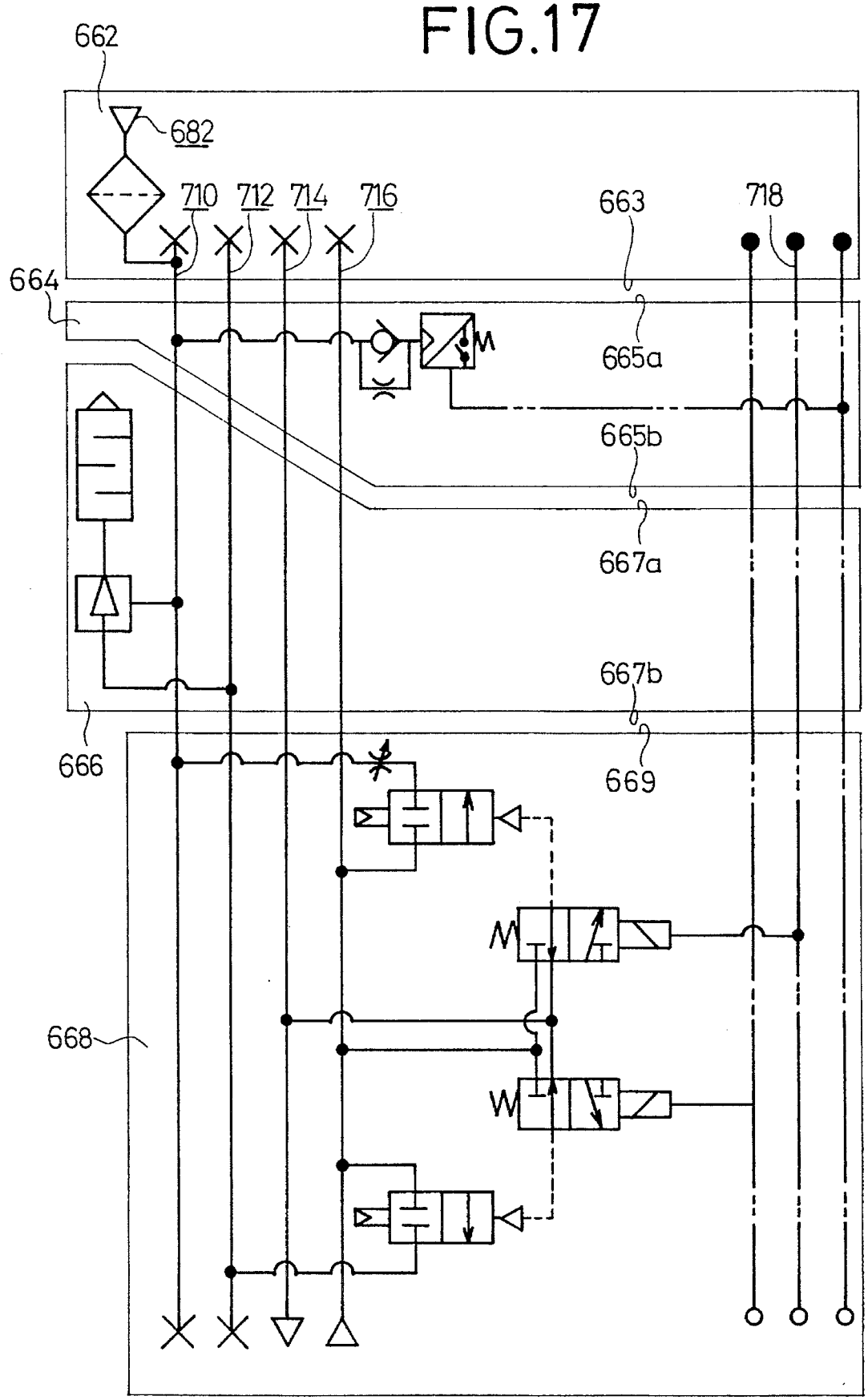
FIG. 17 is a view for describing a fluid circuit and an electric circuit both employed in the vacuum apparatus according to the eighth embodiment shown in FIG. 15.

FIG. 17 shows both an air circuit and an electric circuit of the vacuum apparatus 660. The vacuum apparatus 660 comprises a filter block 662, a pressure switch block 664, an ejector block 666 and a valve block 668. A vacuum introduction passage 710, a compressed-air passage 712 for the ejector, an exhaust passage 714, a compressed-air passage 716, and electrical wires 718 are coupled to one another via the respective joint surfaces 663, 665a, 665b, 667a, 667b and 669. Further, a check valve bypass passage formed within the pressure switch block 664 is provided to slow-down any variation in pressure which may be developed upon vacuum breakage.

Thus, a fluid circuit is formed in each of the blocks. The respective blocks are coupled to one another through the fluid passages 710, 712, 714 and 716 which extend through all of the blocks. Further, a vacuum apparatus having desired functions can be obtained by arbitrarily selecting the joint surfaces provided with the functional portions at respective places on one side surface, and bringing the joint surfaces into engagement with each other. Moreover, since the respective blocks are detachably coupled to each other, they can be easily recombined or rearranged at the work site. It is therefore possible to rapidly replace a defective block with another on the spot.

A ninth embodiment will next be described with reference to FIGS. 18 through 22.

Figure 18:
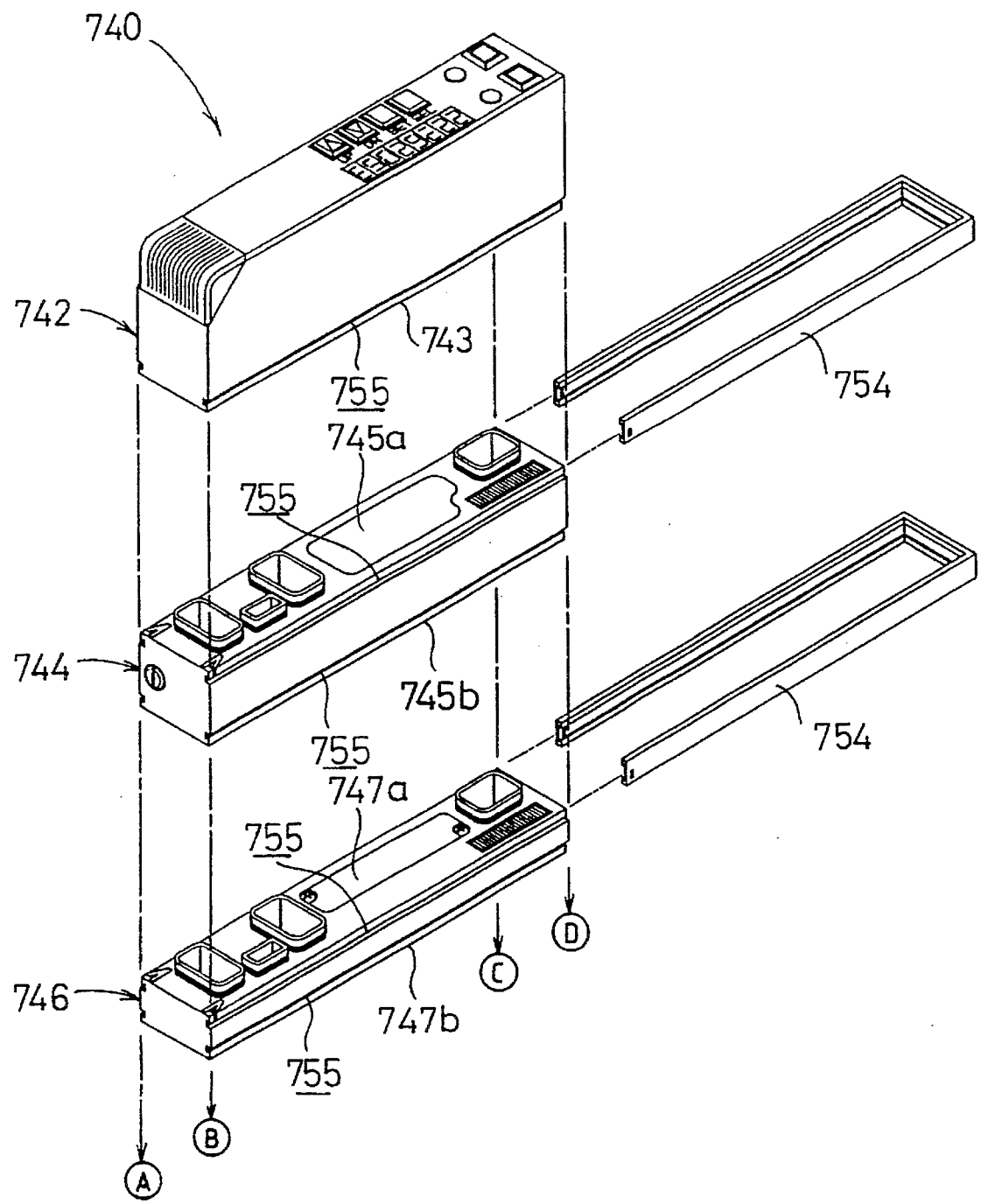
FIG. 18 is a view for describing a vacuum apparatus according to a ninth embodiment of the present invention.
Figure 19:
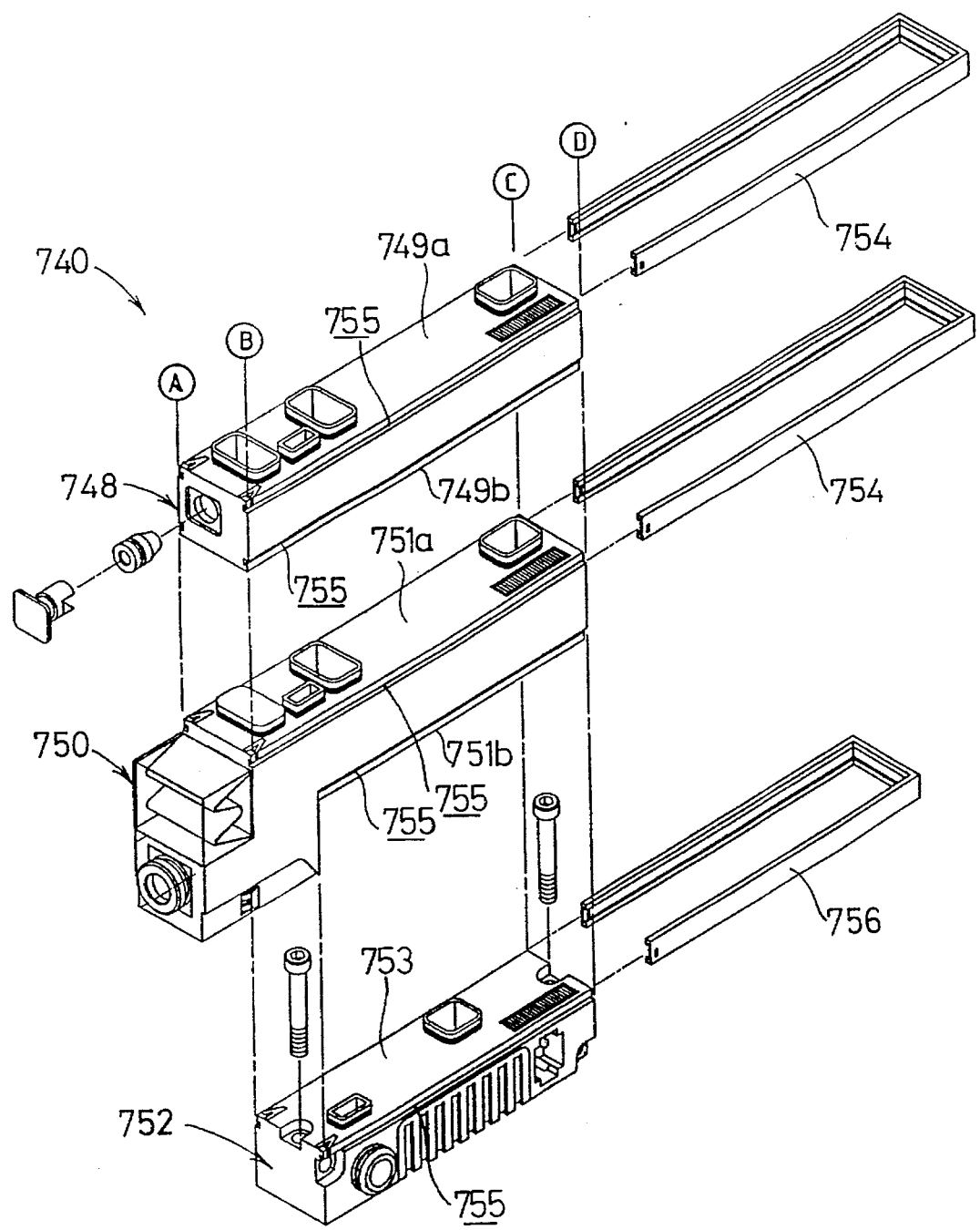
FIG. 19 is a view for explaining the vacuum apparatus according to the ninth embodiment shown in FIG. 18.
Figure 20:
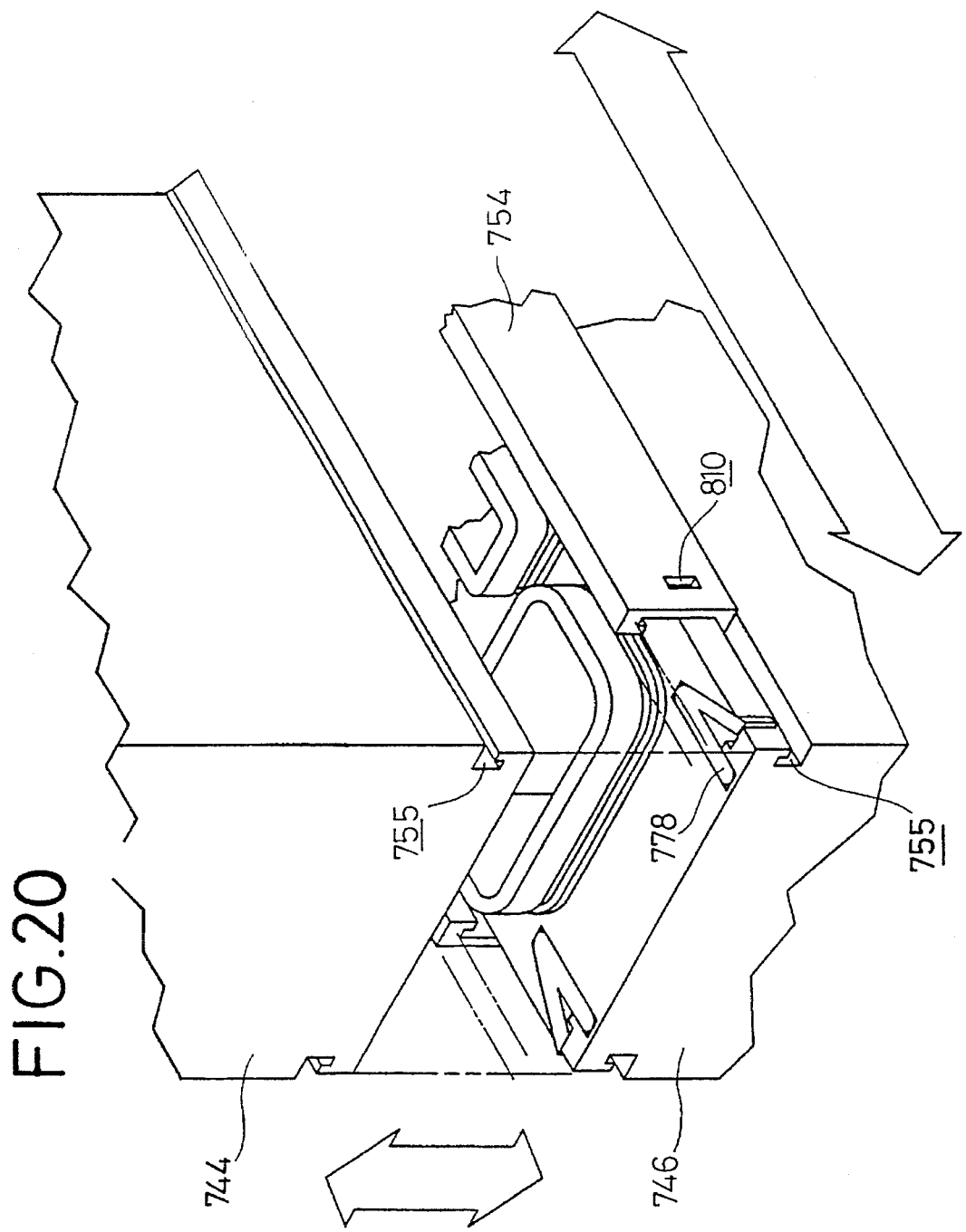
FIG. 20 is a partial explanatory view showing the connection between blocks employed in the ninth embodiment shown in FIG. 18.
Figure 21:
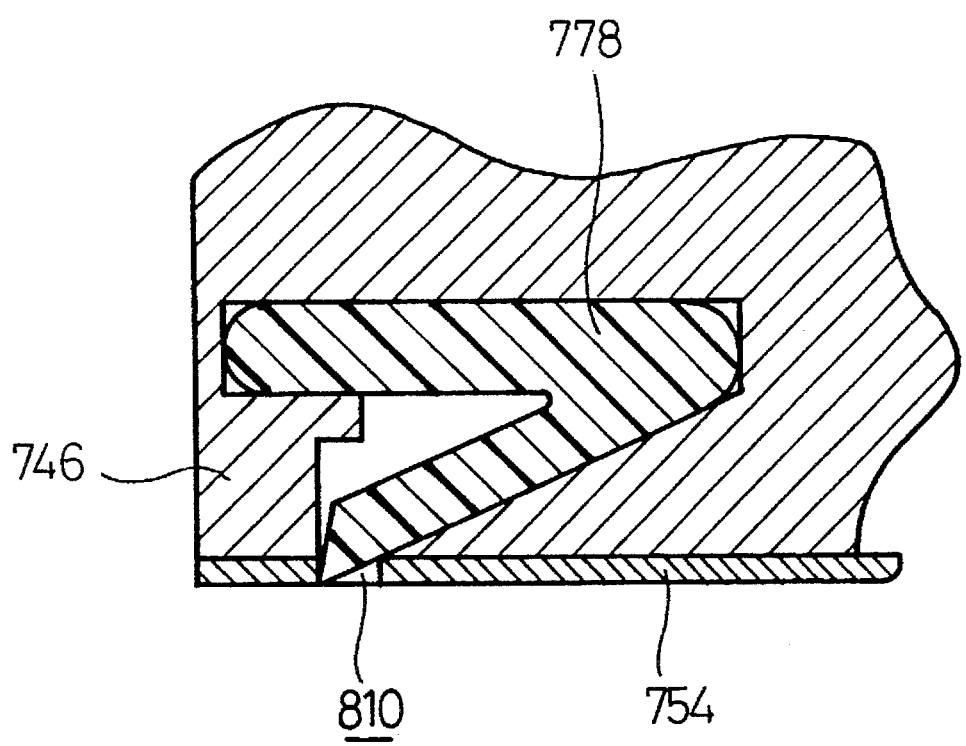
FIG. 21 is a view for describing the fixing of a coupling member employed in the ninth embodiment.

As shown in FIGS. 18 and 19, a vacuum apparatus 740 basically comprises a control block 742, a valve block 744, a pressure switch block 746, an ejector block 748, a filter block 750 and a base block 752. The respective blocks are coupled to one another by connecting members 754 and a connecting member 756.

Here, a joint surface 743 of the control block 742, a joint surface 745b of the valve block 744, a joint surface 747b of the pressure switch block 746, and a joint surface 749b of the ejector block 748 are identical in structure and respectively have functional portions provided at corresponding positions. Further, a joint surface 745a of the valve block 744, a joint surface 747a of the pressure switch block 746, a joint surface 749a of the ejector block 748, and a joint surface 751a of the filter block 750 are also identical in structure and respectively have functional portions provided at corresponding positions. The respective blocks are coupled to each other by inserting the connecting members 754 and the connecting member 756 into their corresponding engagement grooves 755 provided in the vicinity of the side portions of the respective joint surfaces 743, 745a, 745b, 747a, 747b, 749a, 749b, 751a and the joint surfaces 751a and 753 provided between the filter block 750 and the base block 752 (see FIG. 20). Stoppers 778 are also embedded into corresponding ends of the engagement grooves 775. The connecting members 754 and the connecting member 756 are provided with pairs of holes 810 facing each other defined in the ends of the connecting members 754 and 756. The holes 810 are brought into engagement with the corresponding stoppers 778 to prevent the connecting members 754 and 756 from falling off (see FIG. 21).

Finally, a description will be made of embodiments in which covers are mounted on fluid pressure apparatuses or devices.

In the present embodiments, only vacuum feeding apparatuses, which serve as the fluid pressure devices, will be described below. It is however needless to say that the present invention can be applied to other fluid pressure devices.

Vacuum feeding apparatuses which may be employed according to the present embodiments include apparatuses of an ejector-type, a vacuum pump-type and a manifold-type and others. An ejector-type vacuum feeding apparatus will first be described below as a tenth embodiment with reference to FIGS. 22 through 24. A manifold-type vacuum feeding apparatus used as an eleventh embodiment will next be described below with reference to FIG. 25.

Figure 22:
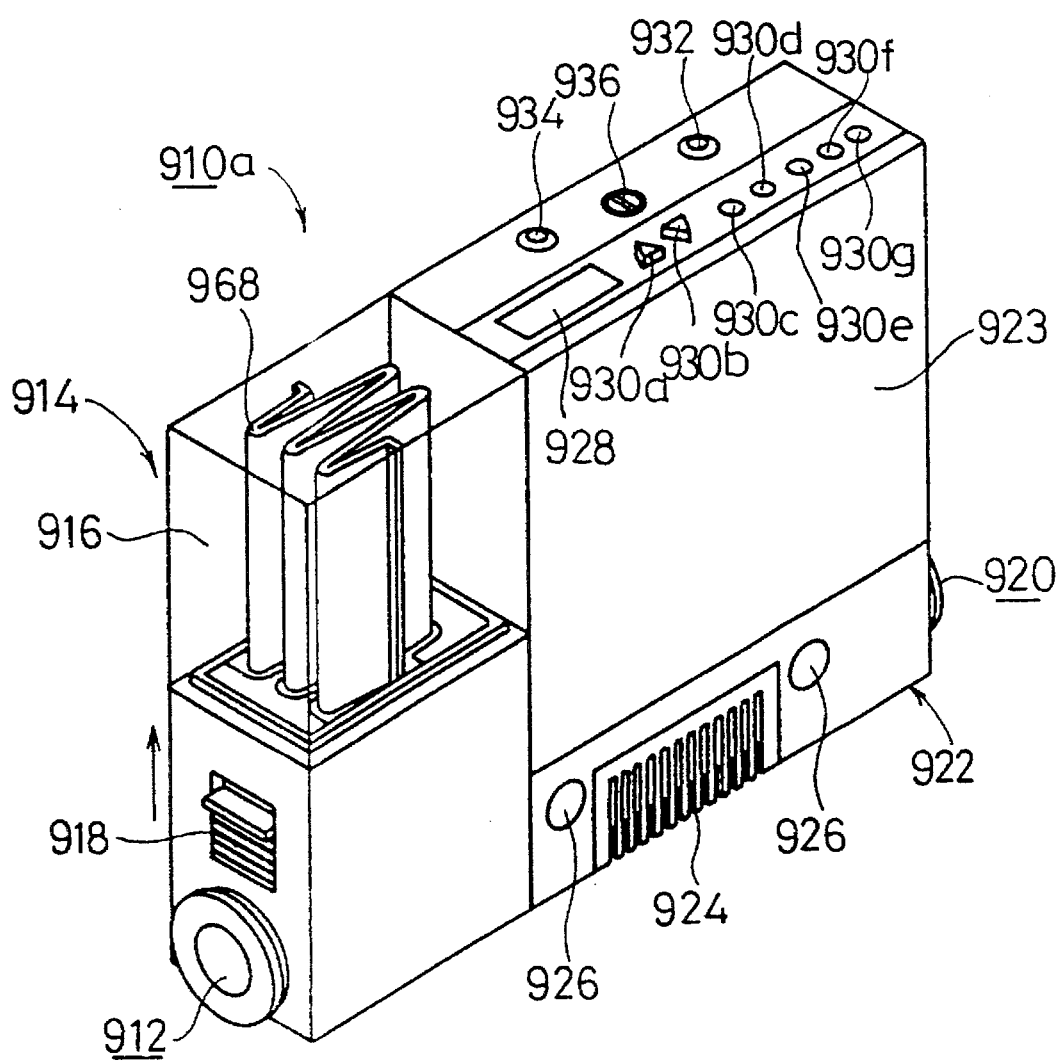
FIG. 22 is a perspective view showing a vacuum feeding apparatus according to a tenth embodiment of the present invention.

As shown in FIG. 22, a vacuum feeding apparatus 910a is shaped in the form of a rectangle. A vacuum port 912 comprised of a one-touch tube fitting, which is connected to a device such as a suction pad or the like, is formed on one side surface of the vacuum feeding apparatus 910a. A button 918 for attaching and detaching a transparent filter case 916 for a filter 914 which is provided at an upper portion of the vacuum feeding apparatus 910a, is also formed on one side surface extending in a transverse direction of the vacuum feeding apparatus 910a. Further, a compressed-air feed port 920 comprised of a one-touch type tube fitting is provided on the other side surface opposite to the one side surface. A base 922 comprises a discharge or exhaust port 924 and mounting screw holes 926 and 926, both of which are provided on a longitudinally-extending side surface thereof. An integrally-formed cover 923 is mounted on an upper portion of the base 922 so as to cover parts, to be described later. A plurality of holes are defined in an upper surface of the cover 923. Various elements are formed in such holes, including: a digital display 928 comprising an LCD for displaying pressure status or the like thereon; pressure setting buttons 930a through 930d; a pressure switch operation indicating lamp 930e; a lamp 930f for indicating the operation of a pilot-operated electromagnetic valve serving as a vacuum break valve; a lamp 930g for indicating the operation of a pilot-operated electromagnetic valve for a feed valve; a manual 932 for the feed valve; a manual 934 for the vacuum break valve; and a control screw 936 for a flow control valve.

Figure 23:
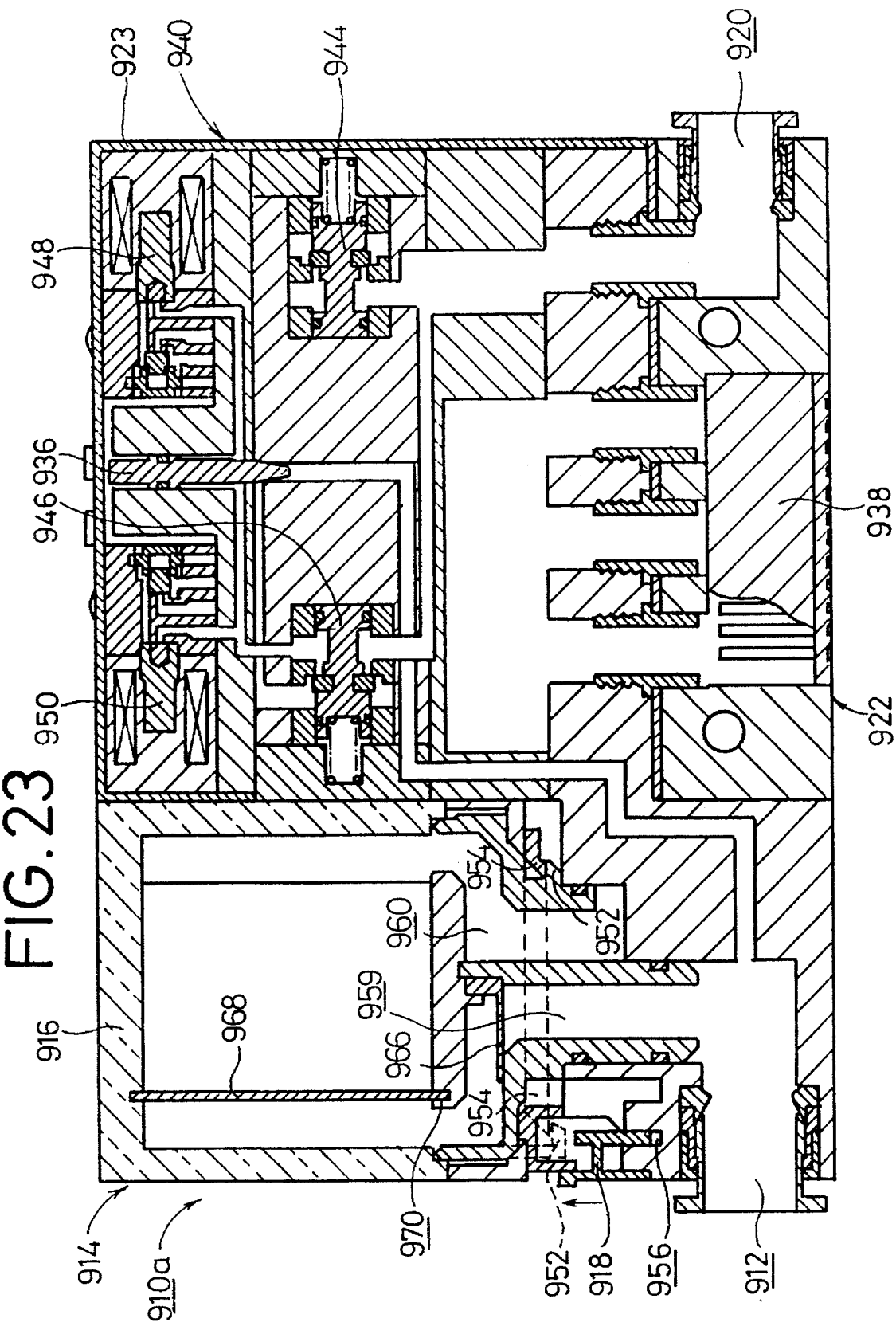
FIG. 23 is a cross-sectional view illustrating an ejector-type vacuum feeding apparatus, according to the tenth embodiment shown in FIG. 22.

As shown in FIG. 23, a silencer element 938 for silencing the sound of exhaust produced from an ejector 942 to be described later, and for discharging the exhaust into the exhaust port 924, is disposed inside the base 922 provided within the vacuum feeding apparatus 910a.

Figure 24:
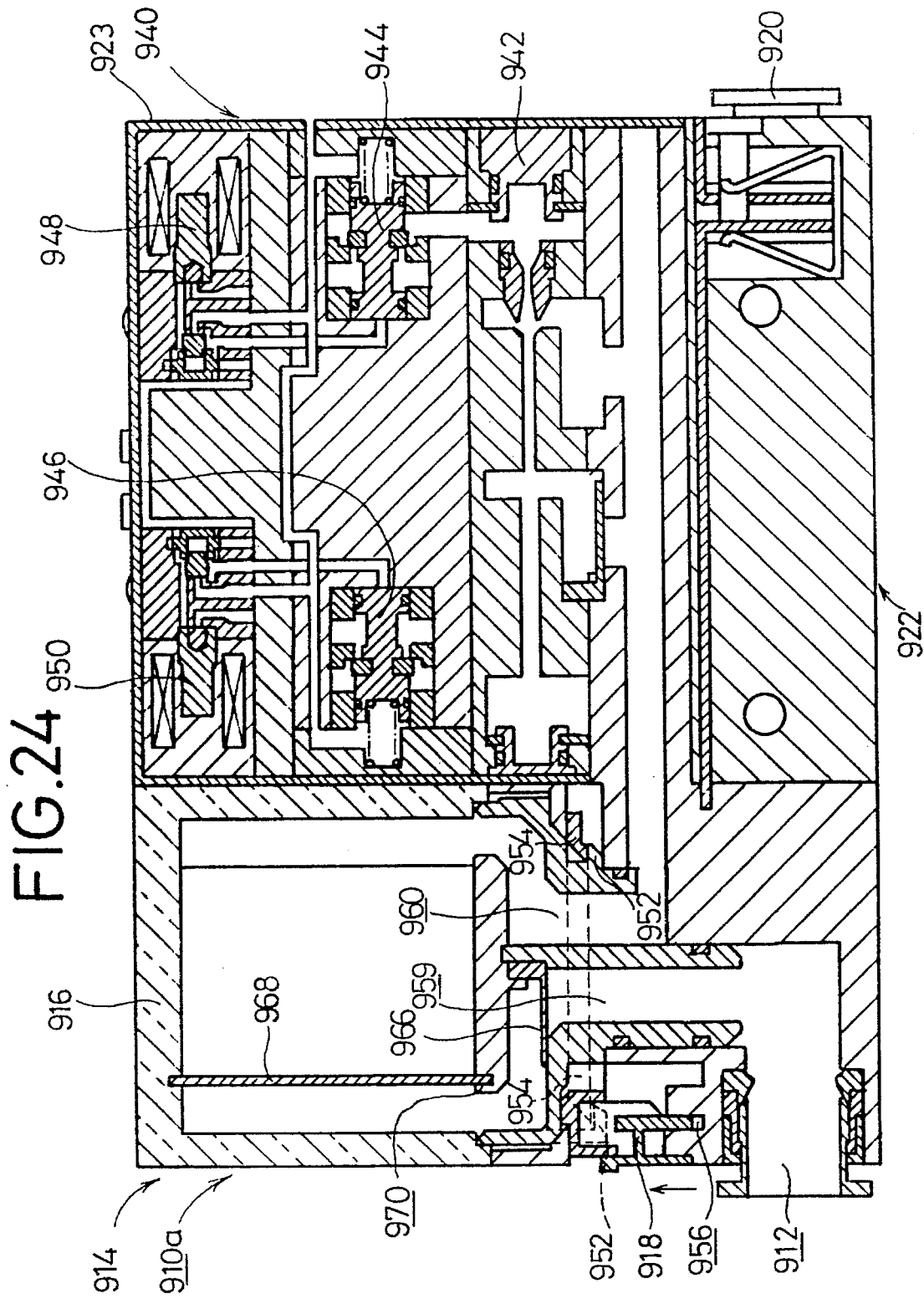
FIG. 24 is a cross-sectional view illustrating the ejector-type vacuum feeding apparatus shown in FIG. 22.

As shown in FIGS. 23 and 24, within the cover 923 of a body 940 of the vacuum feeding apparatus, there are disposed: an ejector 942; a normally-closed type feed valve 944; a vacuum break valve 946; a pilot-operated electromagnetic valve 948 serving as a feed valve and which is used to feed a pilot pressure to each of the feed valve 944 and the vacuum break valve 946; a pilot-operated electromagnetic valve 950 serving as a vacuum break valve; and a flow control valve 936 for controlling the flow rate of compressed air used for vacuum breakage. Further, engagement members 954 for engagement with stoppers 952 are provided at the lower part of the filter 914. A groove 956 is provided so as to lock the button 918.

The filter 914 has in its bottom a passage 959 which communicates with the vacuum port 912 and a passage 960 which communicates with an ejector 942 (see FIG. 24). The filter 914 also includes stoppers 952 which are respectively held in engagement with the engagement members 954 and 954 of the body 940 of the vacuum feeding apparatus. Further, a check valve 966 which is opened only when air is introduced therethrough, is provided in the passage 959. A filter element 968 (see FIG. 22), having a wave-shaped cross section which is provided between the passages 959 and 960, is provided on the check valve 966 and is inserted into a groove 970. The transparent filter case 916 of the filter 914 is attached to an upper portion of the filter element 968, through which the filter can be visually confirmed.

The operation of the vacuum feeding apparatus 910a constructed as described above is described in the following disclosure.

Compressed air supplied from a compressed-air feed source reaches the feed valve 944 and the vacuum break valve 946 via the compressed-air feed port 920 of the vacuum feeding apparatus. When the pilot-operated electromagnetic valve 948 is energized, the feed valve 944 is opened so that the compressed air reaches the ejector 942. Thus, the vacuum feeding apparatus 910a generates a vacuum pressure for drawing air from the suction pad or the like. The drawn air then passes from the vacuum port 912 and through the passage 959 of the filter 914 to thereby open the check valve 966. Thus, the air reaches the filter element 968.

The introduced air, from which dust has been eliminated by the filter element 968, reaches the ejector 942 through the passage 960 and is then discharged from the discharge port 924 via the silencer element 938.

On the other hand, when the suction pad or the like is released, the pilot-operated electromagnetic valve 948 of the vacuum feeding apparatus 910a is de-activated to close the feed valve 944, thereby stopping the generation of the vacuum pressure at the ejector 942. At this time, the check valve 966 in the filter 914 is rapidly closed to prevent any dust stuck to the filter element 968 from entering into an external device, such as the suction pad or the like, through the vacuum port 912.

Thereafter, the pilot-operated electromagnetic valve 950 is energized to open the vacuum break valve 946 to thereby directly feed or supply compressed air from the compressed-air feed port 920 to the vacuum port 912 via the flow control valve 936, so as to release the suction pad from an attracting state.

When heavy clogging or the like of the filter is observed during a period in which the series of operations referred to above are being carried out, the filter 914 or the filter element 968 may be replaced. At this time, the button 918 attached to the transversely-extending side surface of the vacuum feeding apparatus 910a is pushed up (i.e., in the direction indicated by the arrow) so as to pull out the button 918 from the groove 956, thereby releasing the locked state. Further, the button 918 is pushed inward to release the engagement members 954 and 954 from the stoppers 952 of the filter 914, thereby permitting the filter 914 to be taken out from the body 940 of the vacuum feeding apparatus. When only the filter element 968 is to be replaced, the filter case 916 is detached from the body 940 of the vacuum feeding apparatus so as to permit replacement of the filter element 968.

An ejector-type vacuum feeding apparatus 910a constructed in the above-described manner can be formed so as to be stain resistant and in good appearance. Desired shapes, materials and colors may be provided by surrounding the entirety of the vacuum feeding apparatus 910a with the cover 923, regardless of the materials, colors and shapes of the ejector 942, the feed valve 944, the vacuum break valve 946, and the pilot-operated electromagnetic valves 948 and 950, etc. Further, electrical parts such as the pilot-operated electromagnetic valves 948 and 950, etc. can be covered together integrally rather than individually.

Figure 25:
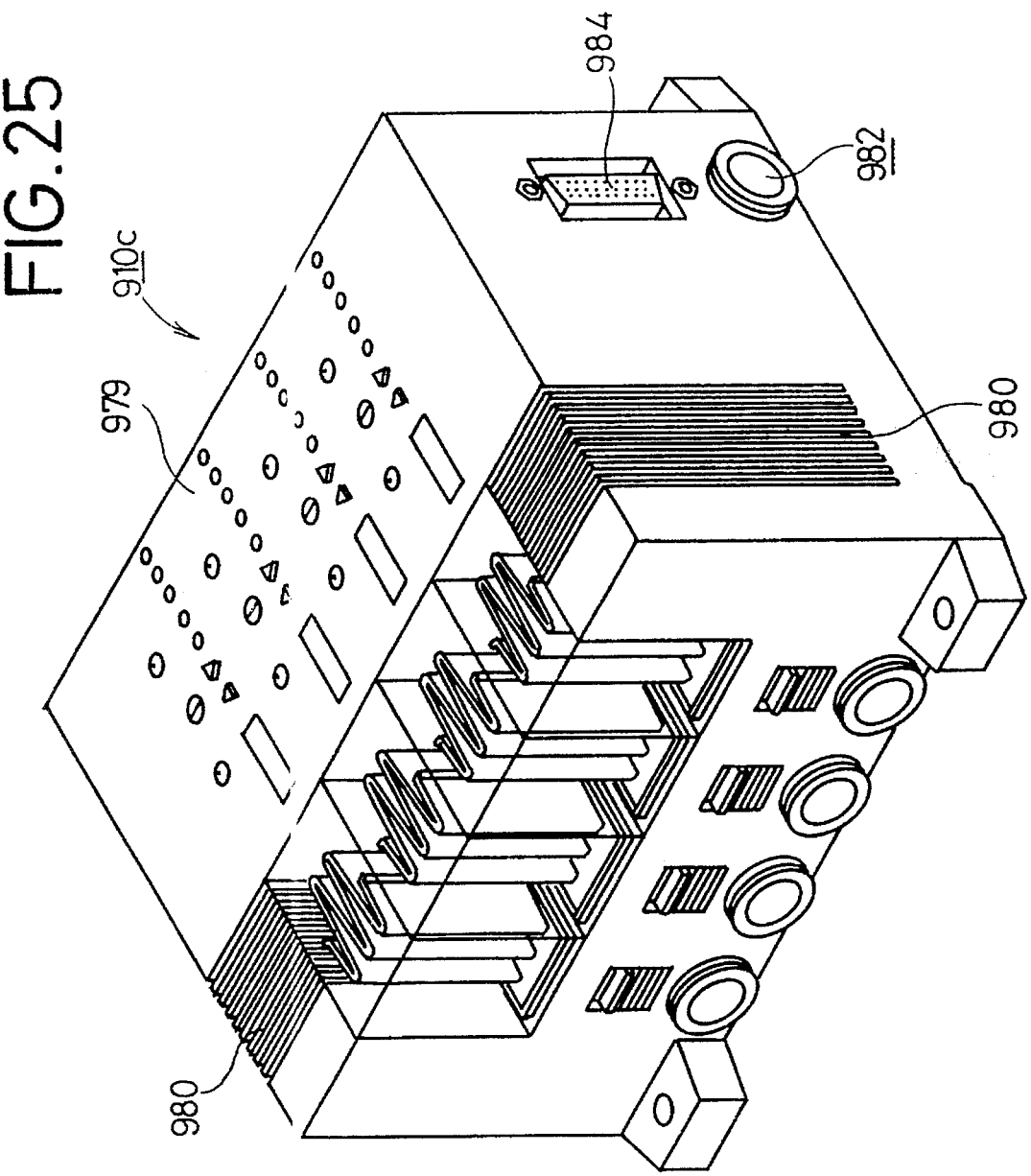
FIG. 25 is a perspective view depicting a manifold-type vacuum feeding apparatus according to an eleventh embodiment of the present invention.

Further, the vacuum feeding apparatus 910a can be converted to a manifold-type vacuum feeding apparatus 910c as shown in FIG. 25. In the vacuum feeding apparatus 910c, compressed-air passages and discharge or exhaust passages are formed on both sides extending in the longitudinal direction of a base which is used substantially as a manifold base. Such an arrangement may be employed as an alternative to the compressed-air feed port 920 and the discharge port 924 defined in the base 922 of the vacuum feeding apparatus 910a. Further, the base and the vacuum feeding apparatus mounted thereon are integrally covered by a cover 979. Exhaust ports 980, compressed-air feed ports 982, and electrical connecting portions 984 are formed on both sides of the cover 979.

Figure 26:
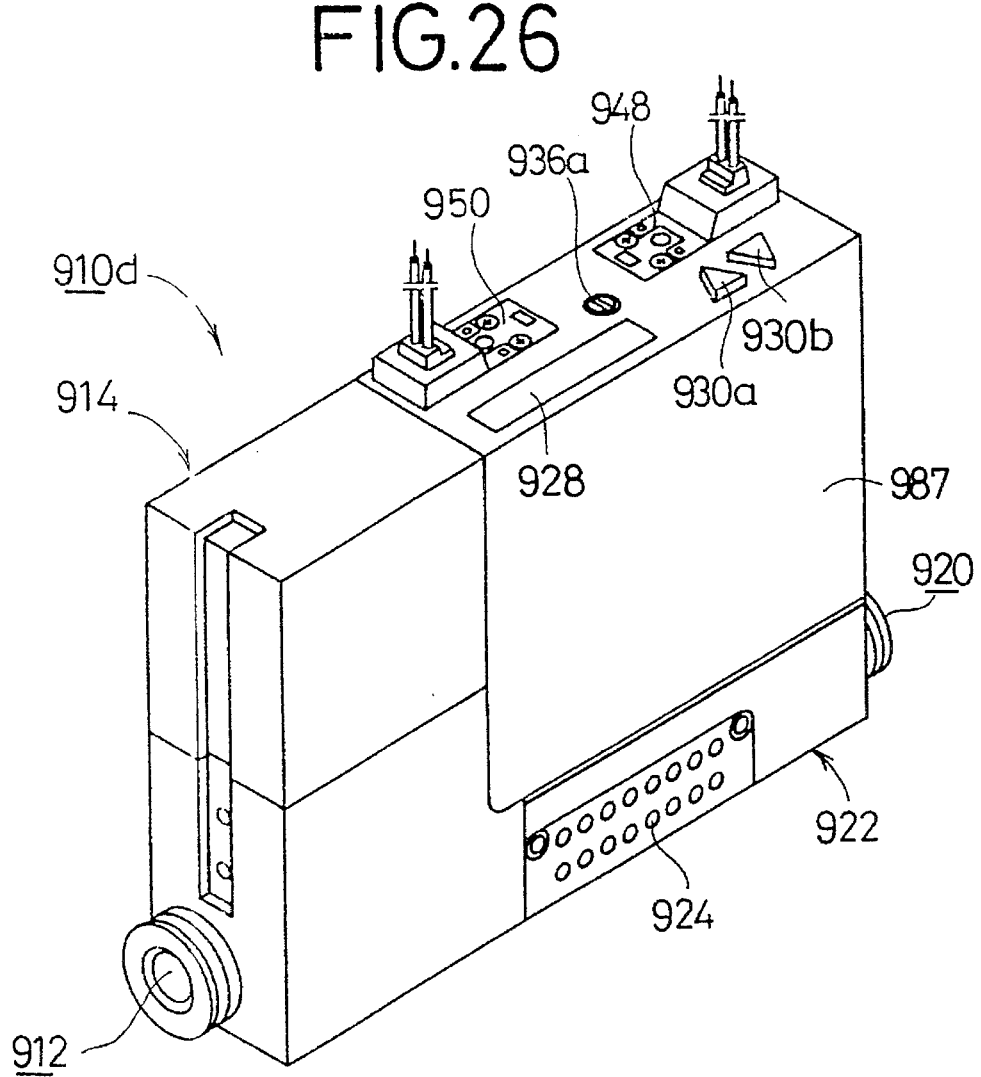
FIG. 26 is a perspective view showing an ejector-type vacuum feeding apparatus according to a twelfth embodiment of the present invention.

Moreover, the vacuum feeding apparatus 910a may also be one in which the cover 923 and the filter element 968 have been changed in shape. As illustrated in FIG. 26, a cover 987 is constructed such that upper surfaces of the pilot-operated electromagnetic valves 948 and 950 are uncovered and attached to an upper surface thereof. By taking off the cover from the upper surfaces of the pilot-operated electromagnetic valves 948 and 950, it becomes possible to allow exhaust heat from the pilot-operated electromagnetic valves 948 and 950 to radiate.

The vacuum feeding apparatuses 910 formed in the above-described manner can be formed with desired materials, colors and shapes by mounting the covers 923, 979 and 987 thereon regardless of the materials, colors and shapes of the components. It is thus possible to provide a vacuum feeding apparatus having good appearance and design.

Further, the electrical parts such as the electromagnetic pilot valves 948 and 950, etc. can be protected by integrally mounting the cover 923 on the vacuum feeding apparatuses 910.

INDUSTRIAL APPLICABILITY

As has been described above, when a plurality of fluid pressure apparatuses according to the present invention, are connected to one another and controlled by the sequencer, the individual fluid pressure apparatuses are provided with controlling means, and a trouble diagnosis or the like is performed by the controlling means, and suited for use in an automated conveyor line or a production line, without imposing any burden on a sequencer.

We claim:

1. A fluid pressure apparatus for supplying and cutting off positive or negative fluid pressure to a fluid pressure controlled device connected to said apparatus, comprising:

a housing;

at least one directional control valve for switching between supply and cut-off of a fluid to said fluid pressure controlled device;

detecting means including a pressure sensor disposed in an interior space inside said housing for detecting an internal pressure of the fluid flowing through said fluid pressure apparatus;

control means disposed in said housing and having a memory means in which a plurality of different control steps are stored for locally controlling an operation of said at least one directional control valve; and display means for displaying a status of said fluid pressure apparatus thereon;

wherein said fluid pressure apparatus comprises a plurality of blocks having respectively different functions, each block having at least one connector made of conductive elastic bodies, and wherein an electrical connection between adjacent blocks is made through the conductive elastic bodies included in said connector.

2. The fluid pressure apparatus as claimed in claim 1, wherein:

a sequencer, disposed separately from and externally of said housing and said control means are electrically connected to communicate signals therebetween.

3. The fluid pressure apparatus as claimed in claim 2, wherein electrical wires for providing electrical connections between said control means and said sequencer are provided inside said housing.

4. The fluid pressure apparatus as claimed in claim 1, wherein each of the blocks forming said fluid pressure apparatus has a connector formed by conductive and non-conductive elastic bodies, and wherein the electrical connection between the adjacent blocks is made through the conductive elastic bodies included in said connector.

5. The fluid pressure apparatus as claimed in claim 1, wherein each of the blocks constituting said fluid pressure apparatus has a connector formed by stacking conductive and non-conductive elastic bodies one after the other, and wherein the electrical connection between the adjacent blocks is made through the conductive elastic bodies included in said connector.

6. The fluid pressure apparatus as claimed in claim 1, wherein each of the elastic bodies forming said connector of each of the blocks comprised in said fluid pressure apparatus is made of either a synthetic resin or rubber.

7. The fluid pressure apparatus as claimed in claim 1, further comprising:

a connector for enabling electrical connection between said fluid pressure apparatus and at least one other fluid pressure apparatus, said connector comprising a plurality of conductive elastic bodies.

8. The fluid pressure apparatus as claimed in claim 7, wherein said connector comprises a plurality of stacked conductive and non-conductive elastic bodies.

9. The fluid pressure apparatus as claimed in claims 7 or 8, wherein each of said elastic bodies is made of a synthetic resin.

10. The fluid pressure apparatus as claimed in claims 7 or 8, wherein each of said elastic bodies is made of rubber.

11. A fluid pressure apparatus for supplying and cutting off positive or negative fluid pressure controlled device connected to said apparatus, comprising:

a housing;

at least one directional control valve for switching between supply and cut-off of a fluid to said fluid pressure controlled device;

detecting means including a pressure sensor disposed in an interior space inside said housing for detecting an internal pressure of the fluid flowing through said fluid pressure apparatus;

control means disposed in said housing and having a memory means in which a plurality of different control steps are stored for locally controlling an operation of said at least one directorial control valve;

display means for displaying a status of said fluid pressure apparatus thereon; and a manifold block for connecting said fluid pressure apparatus to at least one other fluid pressure apparatus;

wherein said fluid pressure apparatus is connected to said manifold block through a connector comprising a plurality of conductive elastic bodies, wherein electrical connection between said fluid pressure apparatus and said at least one other fluid pressure apparatus is made through said conductive elastic bodies.

12. The fluid pressure apparatus as claimed in claim 11, wherein said connector comprises a plurality of stacked conductive and non-conductive elastic bodies.

13. The fluid pressure apparatus as claimed in claims 11 or 12, wherein each of said elastic bodies is made of a synthetic resin.

14. The fluid pressure apparatus as claimed in claims 11 or 12, wherein each of said elastic bodies is made of rubber.

* * * * *